United States Patent
Ferlitsch

(10) Patent No.: US 9,461,834 B2
(45) Date of Patent: Oct. 4, 2016

(54) ELECTRONIC DOCUMENT PROVISION TO AN ONLINE MEETING

(75) Inventor: Andrew Rodney Ferlitsch, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1187 days.

(21) Appl. No.: 12/765,777

(22) Filed: Apr. 22, 2010

(65) Prior Publication Data

US 2011/0264745 A1    Oct. 27, 2011

(51) Int. Cl.
*H04L 12/18* (2006.01)
*G06Q 10/10* (2012.01)

(52) U.S. Cl.
CPC ......... *H04L 12/1827* (2013.01); *G06Q 10/109* (2013.01)

(58) Field of Classification Search
USPC .................................................. 709/204, 219
See application file for complete search history.

(56) References Cited

U.S. PATENT DOCUMENTS

| | | | |
|---|---|---|---|
| 6,161,149 A * | 12/2000 | Achacoso ............... H04L 12/58 709/203 |
| 6,182,080 B1 | 1/2001 | Clements | |
| 6,237,025 B1 * | 5/2001 | Ludwig et al. ............... 709/204 |
| 6,317,777 B1 * | 11/2001 | Skarbo et al. ................ 709/204 |
| 6,636,888 B1 * | 10/2003 | Bookspan et al. ........... 709/203 |
| 6,728,753 B1 * | 4/2004 | Parasnis et al. .............. 709/203 |
| 7,287,058 B2 * | 10/2007 | Loveland et al. ............ 709/206 |
| 7,359,946 B2 * | 4/2008 | Thakkar et al. .............. 709/206 |
| 7,461,347 B2 | 12/2008 | Zhu et al. | |
| 7,472,351 B1 | 12/2008 | Zika | |
| 7,590,663 B2 * | 9/2009 | Hamer | |
| 7,627,652 B1 * | 12/2009 | Commons ............ H04L 67/1097 709/213 |
| 7,679,518 B1 * | 3/2010 | Pabla et al. ................. 340/573.1 |
| 7,992,212 B2 * | 8/2011 | Nagata ..................... H04L 63/10 705/51 |
| 8,156,115 B1 * | 4/2012 | Erol ......................... G06T 5/009 382/181 |
| 8,626,794 B2 * | 1/2014 | Liao ..................... G06F 21/6227 707/791 |
| 2002/0091769 A1 * | 7/2002 | Drozdzewicz et al. ...... 709/204 |
| 2004/0019640 A1 * | 1/2004 | Bartram ............ G06F 17/30206 709/205 |
| 2004/0059785 A1 * | 3/2004 | Blume ................. G06Q 10/109 709/206 |
| 2004/0141005 A1 | 7/2004 | Banatwala et al. | |
| 2004/0172450 A1 * | 9/2004 | Edelstein ............... G06Q 10/10 709/205 |

(Continued)

FOREIGN PATENT DOCUMENTS

WO    WO0165336    9/2001

OTHER PUBLICATIONS

Office Watch, Easy Invitations in Outlook, Dec. 18, 2009.*

(Continued)

*Primary Examiner* — Backhean Tiv
(74) *Attorney, Agent, or Firm* — Law Office of Gerald Maliszewski; Gerald Maliszewski

(57) ABSTRACT

A system and method are presented for providing electronic documents to online meeting participants. The method schedules a first online meeting between network-connected computer devices. A meeting server establishes a repository for the first online meeting. The meeting server receives an electronically formatted document sent to a first communication address assigned to the first online meeting repository, and stores the document in the first online meeting repository. A first computer device is able to log into the meeting server and access the document from the first online meeting repository at a time prior to, during, or after the first online meeting. Likewise, the meeting server is able to store a document received prior to, during, or after the meeting.

31 Claims, 12 Drawing Sheets

(56) References Cited

U.S. PATENT DOCUMENTS

| | | | |
|---|---|---|---|
| 2004/0237045 A1 | 11/2004 | Meltzer | |
| 2004/0243454 A1* | 12/2004 | Yoshida | G06Q 30/016 705/304 |
| 2005/0033811 A1 | 2/2005 | Bhogal et al. | |
| 2005/0261949 A1* | 11/2005 | Martin | G06Q 10/10 705/1.1 |
| 2006/0136511 A1 | 6/2006 | Ngo et al. | |
| 2006/0190546 A1 | 8/2006 | Daniell | |
| 2006/0203278 A1* | 9/2006 | Makishima | 358/1.14 |
| 2007/0005692 A1 | 1/2007 | Gist et al. | |
| 2007/0094235 A1* | 4/2007 | Akagawa | G06F 3/061 |
| 2007/0185956 A1* | 8/2007 | Ogle et al. | 709/204 |
| 2007/0271344 A1* | 11/2007 | Danasekaran | G06Q 10/10 709/206 |
| 2008/0028323 A1 | 1/2008 | Rosen et al. | |
| 2008/0065727 A1* | 3/2008 | Majors | G06Q 10/10 709/205 |
| 2008/0095373 A1* | 4/2008 | Nagata et al. | 380/278 |
| 2008/0307035 A1 | 12/2008 | Burckart et al. | |
| 2009/0125522 A1* | 5/2009 | Kodama | G06F 17/30165 |
| 2009/0177754 A1 | 7/2009 | Brezina et al. | |
| 2009/0182763 A1 | 7/2009 | Hawking | |
| 2009/0192845 A1* | 7/2009 | Gudipaty et al. | 705/7 |
| 2010/0121666 A1* | 5/2010 | Niazi | G06Q 10/0633 705/7.27 |
| 2011/0154192 A1* | 6/2011 | Yang | G06F 17/2288 715/256 |
| 2011/0179083 A1* | 7/2011 | Galloway | G06F 13/385 707/783 |
| 2011/0184935 A1* | 7/2011 | Marlin | G06Q 10/10 707/719 |
| 2011/0264745 A1* | 10/2011 | Ferlitsch | G06Q 10/109 709/205 |
| 2014/0033067 A1* | 1/2014 | Pittenger | G06F 21/606 715/751 |

OTHER PUBLICATIONS

Google search, p. 1.*

* cited by examiner

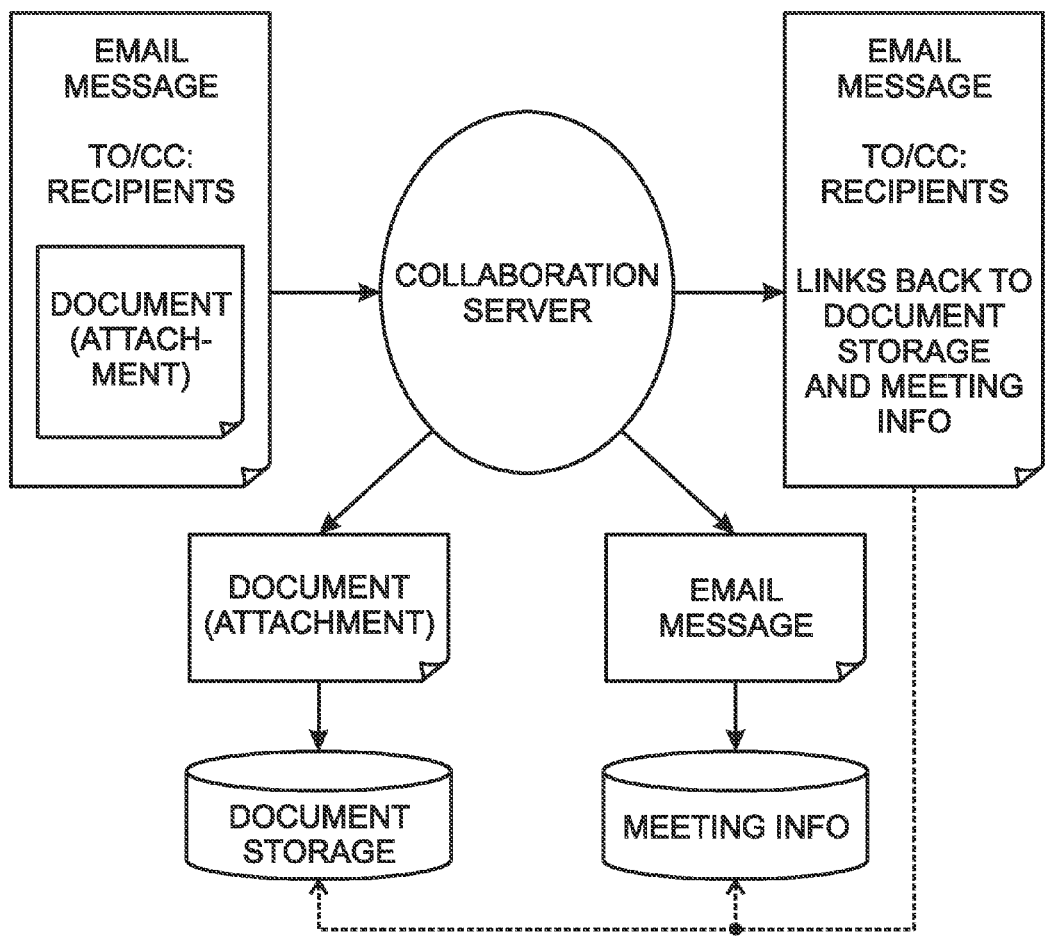
Fig. 1A *(PRIOR ART)*
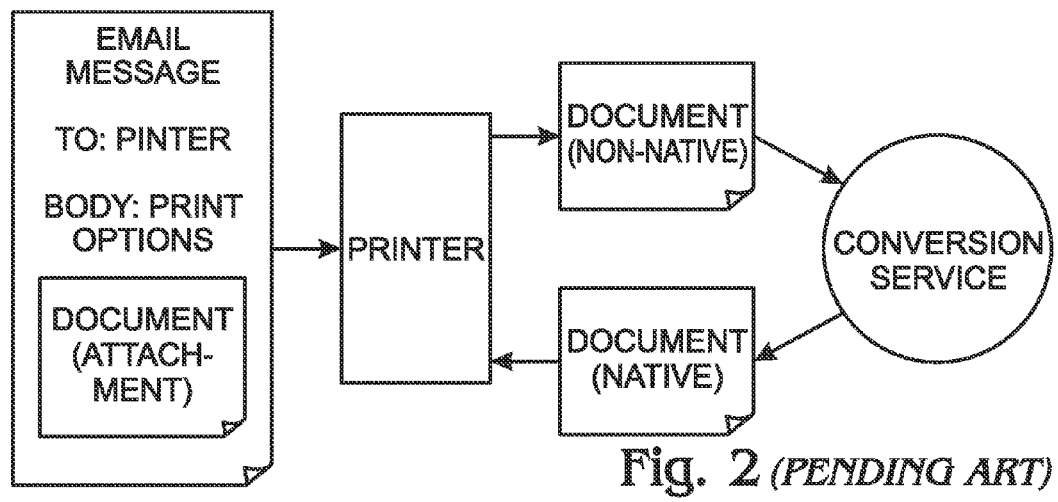
Fig. 2 *(PENDING ART)*

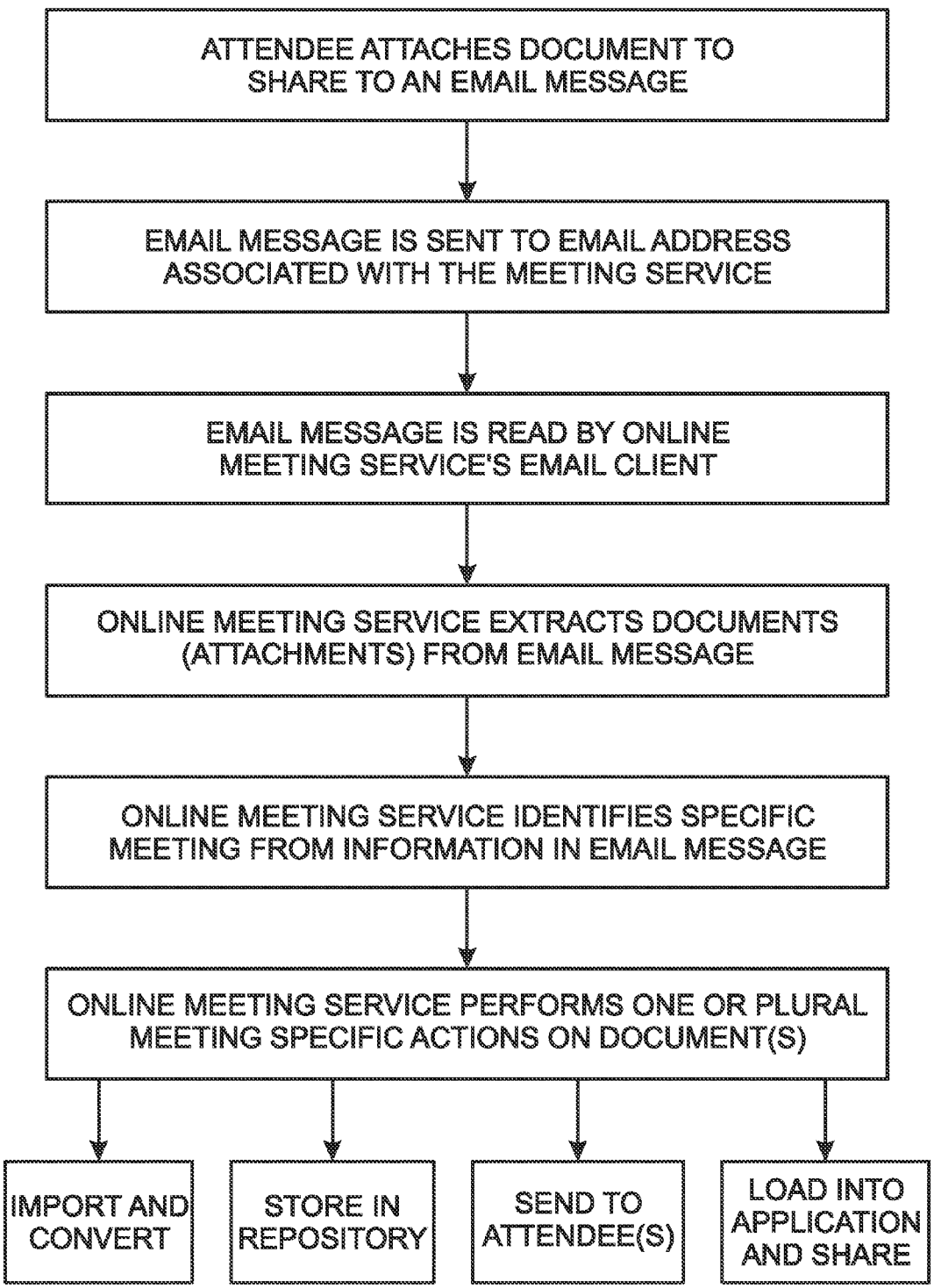

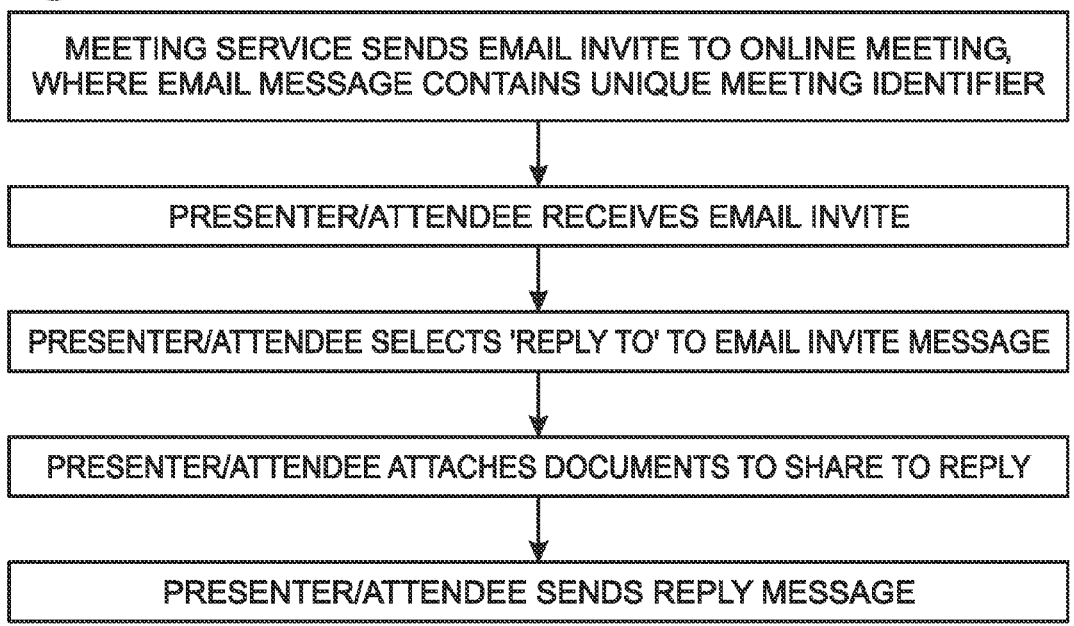
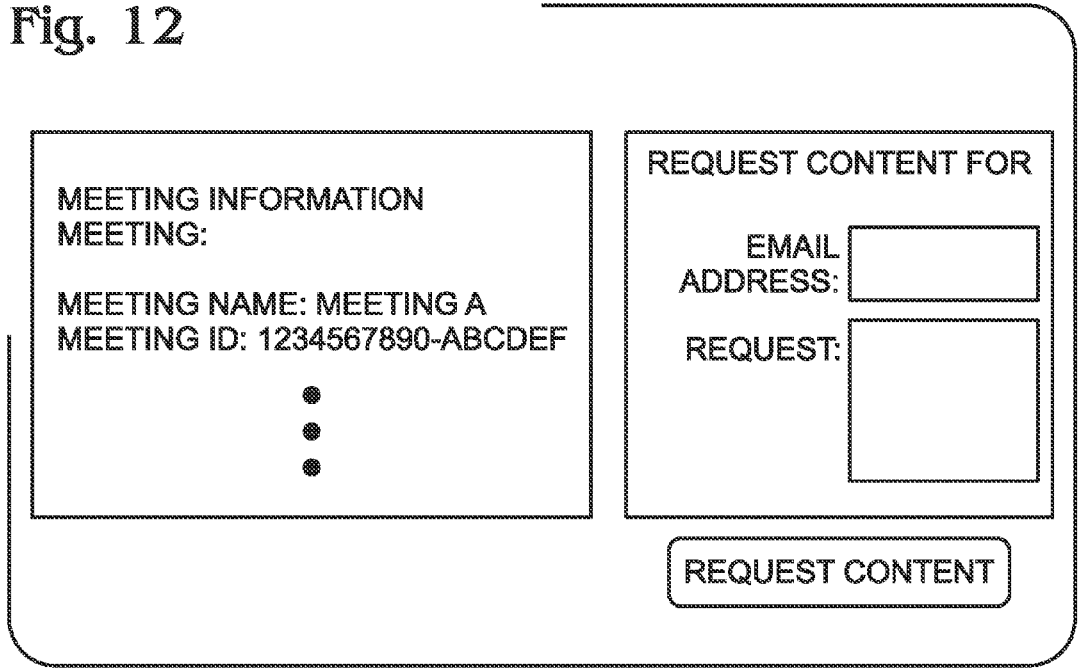

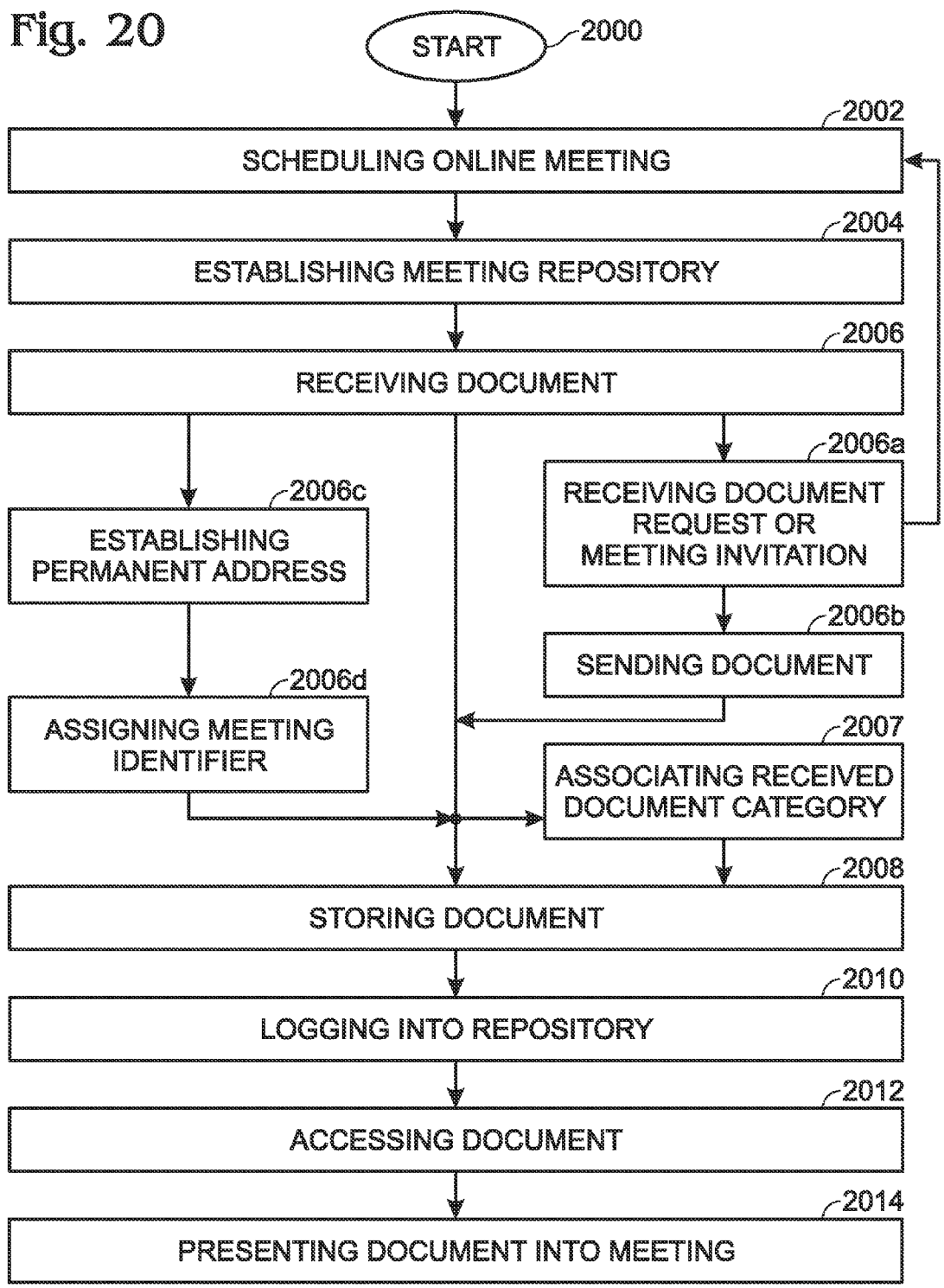

ELECTRONIC DOCUMENT PROVISION TO AN ONLINE MEETING

BACKGROUND OF THE INVENTION

1. Field of the Invention

This invention generally relates to online and web conferencing meetings and, more particularly, to a means of requesting content in a live meeting from a non-meeting participant and sharing a document for presentation in the online meeting.

2. Description of the Related Art

Generally, the problem being addressed is the sharing of an electronic document in an online meeting (e.g., web conference), when the user has neither an application to share the document via an application sharing mode, or a web interface to upload the document for sharing (e.g., web enabled phone or multifunctional peripheral (MFP) scan-to-email). There are a number of well-known online meeting services that fail to adequately address this problem. These meeting services include: Cisco WebEx, Citrix GotoMeeting, Microsoft LiveMeeting, Adobe Connect, IBM Lotus Sametime, and DimDim.

FIG. 1 is a schematic block diagram depicting a method for remote document collaboration (prior art). As disclosed in US pending patent US2004/0172450, Method to initiate server based collaboration on e-mail attachments, a user initiates collaboration on a document by sending it as an attachment in an email. The email is first processed by a collaboration server, which extracts the documents to be shared and stores them on the collaboration server, and replaces the attachment in the email with a link to the document on the collaboration server. A collaboration session is then constructed by the service.

This method does not provide a solution for importing a document into an existing scheduled meeting, and does not provide a solution for importing a document into a live meeting, by either a non-participant or from a source that is not logged into the meeting service. The collaboration session is not a live simultaneous meeting. Instead, the document is stored as a shared document at an online document repository for collaboration by multiple users.

Another method for email based collaboration is disclosed in U.S. Pat. No. 6,182,080, System, method and computer program product for storage of a plurality of documents within a single file. In this method, a file container is constructed of a plurality of files for collaboration. An email list of collaborators is constructed, and the file container and email address list are sent to a collaboration server. The collaboration server constructs a first email message addressed to the first recipient. The message includes the file container and the recipient list minus the first recipient.

The first recipient, after receiving the email message, opens the message and edits the files in the file container. Upon completion (i.e., close message, or reply to collaboration server), the collaboration server constructs a second email message addressed to the next recipient in the recipient list. The message includes the edited file container and the recipient list minus the current recipient. The process is repeated until there are no recipients left.

This method does not provide a solution for importing a document into an existing scheduled meeting, and does not provide a solution for importing a document into a live meeting by either a non-participant or from a source that is not logged into the meeting service. The collaboration session disclosed is not a live meeting. Instead, it's an offline coordinated round-robin editing of a document.

FIG. 2 is a schematic block diagram depicting a printer method for sending documents (pending art). In this method, a printer has an email address, which can be used to send documents for printing. A user attaches the documents to print in the email message to the printer. The user may specify print options in the email message body. The attached files typically need to be in a format (e.g., PDL) that is native to the printer. In a variation of this method disclosed in pending application U.S. Ser. No. 11/737,607, Thin client driverless printing using a direct rendering server, the printer forwards any document in a non-native format to a document conversion service, which converts the document to a native format and sends it back to the printer for printing.

In another variation of email print, the printer supports a plurality of email addresses, where each email address is associated with a different print option. For example, booklet@myprinter.com and duplex@myprinter.com may tell the printer to print in booklet or duplex mode, respectively. These methods do not disclose a means of where to route a document in an email message, or a means for importing a document into a scheduled or live meeting.

Another method related to document collaboration via email, is scanning a document into a workflow, where the scanned document image is sent to the workflow via email. In this case, an email address is associated with a document workflow. The user scans a document on a scanner which supports sending the scanned image data via email. The user specifies the email address of the workflow as the destination for the scanned document image.

This method is limited to routing to a predetermined fixed source (i.e., named workflow). It does not disclose a means to use information in the email to find a matching source that is temporary in nature (e.g., a scheduled or live meeting). Neither does it disclose a means for importing a document into a scheduled or live meeting.

Thus, the conventional online meeting services require Internet connectivity, regardless of solution, for sharing a document in an online meeting. That is, a participating device must have web access to the Internet. However, the Internet may not be available if the device is a mobile device lacking Internet capability, or the meeting is based on an Internet service not enabled on the mobile device. Further, there may be a lack of WiFi connectivity at the user's current location, or the network transfer may be limited to email/ftp (MFP Network Scan).

Thus, a solution is required for devices with some form of WAN/LAN connectivity, but lacking Internet connectivity and/or web browser access.

A closely related issue is the problem of obtaining content after a meeting has started (live) from a user/owner that is not actively participating in the meeting. For example, a company may be having an online meeting whose participation is restricted to senior management. During the meeting, there is a need to obtain hiring data from the HR department. The participants in the meeting would therefore desire a simple way to request the HR department directly import the content into the meeting, without being a participant in the meeting.

While conventional online meeting services provide methods for the host to import content into a live meeting, they all have limitations in importing from non-host attendees, and provide no means for importing content from non-participants.

The Cisco WebEx meeting service allows a host to import content into a live meeting thought a variety of means. Presentations can be directly uploaded. For a limited number of formats (e.g., PDF or PowerPoint), the host or attendee can upload a document to the service. The service converts the document to the WebEx presentation format, which may then be rendered for display by the service. A host or attendee may also import a document from their PC by printing it to a WebEx file uploading virtual printer. This virtual printer converts the document on the host's PC to a presentation format and uploads it to the meeting service. Alternately, a host can preload a document of a limited number of formats, which will be automatically launched and optionally time presented when the meeting starts. Finally, the host and attendees may make online notes during the meeting.

The Citrix GotoMeeting does not support importing content, or online notes.

The Microsoft Live Meeting service allows a host to import content into a live meeting thought a variety of means. Direct upload for presentation—for a limited number of formats (PDF or MS-Office formats), the host or attendee can upload a document to the service. The service converts the document to the Live Meeting presentation format, which may then be rendered for display by the service. Print to Share—a host or attendee may import a document from their PC by printing it to a Live Meeting file uploading virtual printer. This virtual printer converts the document on the host's PC to a presentation format and uploads it to the meeting service. The host may make online notes during the meeting. The Microsoft Live Meeting service does not support preloading content.

The DimDim meeting service allows a host to import content into a live meeting thought a variety of means. Direct upload for presentation—for a limited number of formats (PDF or PowerPoint), the host or attendee can upload a document to the service. The service converts the document to the WebEx presentation format, which may then be rendered for display by the service. The DimDim meeting service does not support preloading content or online notes.

The Adobe Connect meeting service allows a host to import content into a live meeting thought a variety of means. Direct upload for presentation—for a limited number of formats (e.g., PDF, PowerPoint, Flash), the host or attendee can upload a document to the service. The host may make online notes during the meeting.

None of the aforementioned solutions did provide a means to request and import content during (or before) a live meeting from a non-participant.

It would be advantageous if a predetermined or impromptu request can be made in a live meeting to a non-meeting participant for the importation of content, such as: documents, status/summaries and responses.

It would be advantageous to integrate the imported content with the meeting content, and categorize the content based on the reason for the request (e.g., action items).

It would be further be advantageous if the request and importation occur asynchronous to the meeting, such that the content can be received and imported between periods of the live meeting, when the meeting is a continuous or otherwise recurring meeting.

SUMMARY OF THE INVENTION

Disclosed herein are a system and method that expands online meeting document sharing for non-Internet browsing capable devices, such as 1G mobile phones or multifunctional peripherals (MFPs), or where Internet access to the online meeting is blocked by a firewall, who otherwise have email connectivity. In a conventional operating environment, an online meeting is scheduled with a meeting service. The online meeting service may be enterprise hosted or hosted by a third party service. When the meeting is scheduled (or thereafter), one or more attendees are requested. Each attendee has an email address associated with them. A meeting request is then sent to the email address of each attendee. Each attendee receives the email message via an email client running on a computing device, such as a PC, laptop or mobile device. The computing device from which the user operates the email client can additionally store or access documents, and send documents as attachments via email.

When scheduling a meeting, the user performs typical tasks with scheduling an Outlook meeting, including: 1) setting time and location, 2) inviting attendees, 3) selecting a room resource, and 4) sending invites to the attendees. The user may also preload content for presentation in the meeting as part of the scheduling task.

The system disclosed herein additionally permits a user to email a document into a "live", scheduled, or completed multi-user/multi-site online meeting for presentation and collaboration. The user does this by sending the document as an email attachment, to an email address associated with the live, scheduled, or completed online meeting. Upon receipt of the document, the online meeting service may: convert the document to a presentation format; store the document in a meeting repository; send the document to one or more meeting attendees; or, present the document for application sharing (either at the service or remote PC).

In one aspect, the user sends the document to a "temporary" email address associated with the online meeting. For example, when the meeting is scheduled, the service assigns the meeting a meeting PIN to uniquely identify the meeting. In another embodiment, the user sends the document to a predefined email address associated with the meeting service, and identifies the meeting within the email, such as in the subject or body. In another aspect, the user sends the email attachment by replying back to the email invite message sent by the meeting service. The original email message sent by the service has coded in it a meeting identifier which the meeting service can parse out when the message is sent back as a reply.

In one aspect, a meeting host, presenter or other meeting participant with the authority makes a request for content from a non-meeting participant. For example, the participant selects a menu button from the online meeting UI (e.g., desktop or browser application) to select or enter a non-meeting participant. In one case, the user can browse and select from a predetermined list of non-meeting participants. Alternately, the participant may enter the electronic contact address (e.g., email or IM) of the non-meeting participant. Once the non-meeting participants have been selected, the participant enters additional information on what content is being requested. The online meeting service then constructs an electronic message to each selected non-meeting participant for the requested content and sends the message to each non-meeting participant's electronic contact address. The request for content may occur: prior to a meeting (content is stored in a pre-meeting repository); during a meeting (content is stored in a launch area; or, after the meeting (content is added to available meeting documents). The content request may also be specific to a category or activity within the meeting, and the content requesting email would be further augmented to indicate the category.

Accordingly, a method is presented for providing electronic documents to online meeting participants. The method schedules a first online meeting between network-connected computer devices. A meeting server establishes a repository for the first online meeting. The meeting server receives an electronically formatted document sent to a first communication address assigned to the first online meeting repository, and stores the document in the first online meeting repository. A first computer device is able to log into the meeting server and access the document from the first online meeting repository at a time prior to, during, or after the first online meeting. Likewise, the meeting server is able to store a document received prior to, during, or after the meeting.

Additional details of the above-described method and an electronic document provision system for online meetings are provided below.

BRIEF DESCRIPTION OF THE DRAWINGS

FIG. 1 is a schematic block diagram depicting a method for remote document collaboration (prior art).

FIG. 2 is a schematic block diagram depicting a printer method for sending documents (pending art).

FIG. 6 is a flowchart depicting an exemplary document transmission process.

FIG. 7 is a flowchart illustrating an exemplary email reply process.

FIG. 12 is an exemplary rendering of an HTML form suitable for requesting meeting content.

FIG. 20 is a flowchart illustrating a method for providing electronic documents to online meeting participants in a system of connected communication devices.

DETAILED DESCRIPTION

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 3:
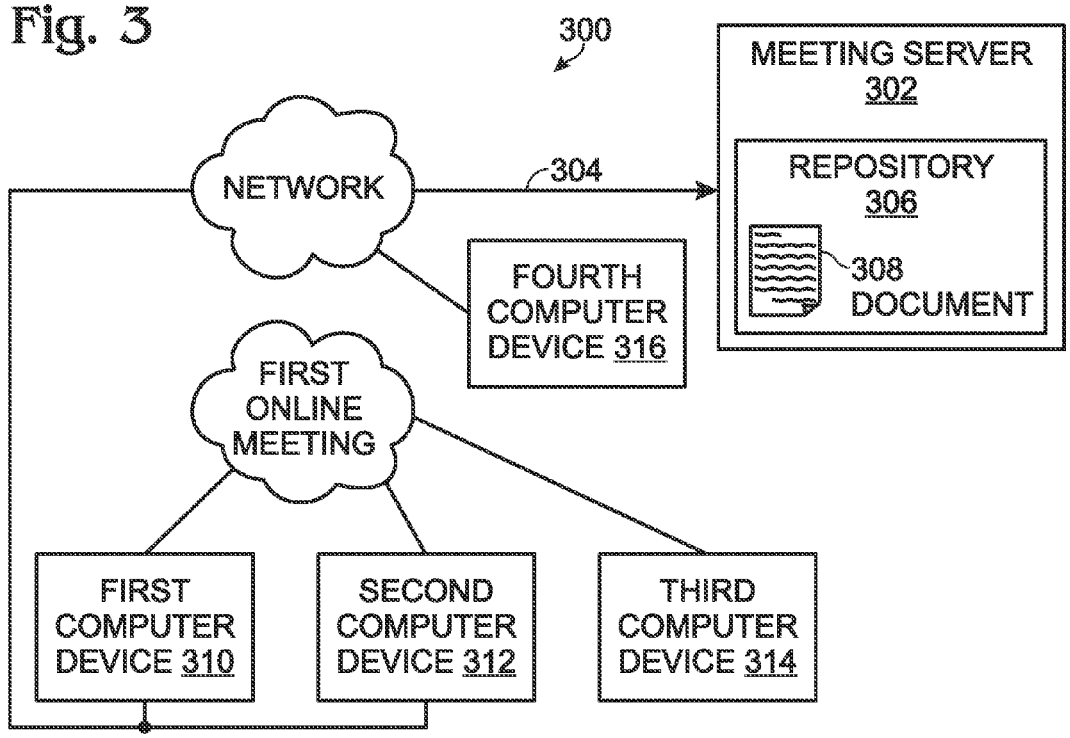
FIG. 3 is a schematic block diagram depicting an electronic document provision system for online meetings.

FIG. 3 is a schematic block diagram depicting, an electronic document provision system for online meetings. The system 300 comprises a meeting server 302 having a web service interface on line 304 to accept a first online meeting schedule from a meeting organizer, and a repository 306 for the first online meeting. Typically, line 304 represents a wide area network (WAN) or local area network (LAN) connection. The meeting server 302 is able receive an electronically formatted document 308 sent to a first communication address assigned to the first online meeting repository, at a time prior to, during, or after the first online meeting. An electronically formatted document is a document capable of being stored and communicated in a digital format. MS-Word and Adobe PDF are just two examples of document formats. The system is not limited to any particular document format.

The meeting server 302 may be enabled with an application (e.g., a meeting service) including a sequence of software instructions stored in a computer-readable memory and executed by a processor. Since the manipulation of software instructions is well known in the art, these details are not shown in order to simply the figure. The meeting service is typically an online (Internet) or server-based (Intranet) meeting service hosted. Generally, under both scenarios, the meeting server has a web service interface and the meeting scheduler interacts with the meeting server via the web service interface. In other web-based programming models, the meeting server would implement a REST based API interface, and the meeting scheduler would interact using the REST based API interface.

The meeting server and computer devices discussed below may employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The meeting server 302 may temporarily assign the first communication address, exclusively associated with the first online meeting. For example, the meeting server may assign the address first_online_meeting@meeting_server.com for a two-week prior to the actual meeting, and let the address expire two weeks after the meeting. Alternately, the meeting server may establish a permanent first communication address associated with a plurality of online meetings (e.g., meetings@meeting_server.com), and assign an identifier to the first online meeting. The identifier can be a meeting PIN, the Internet Protocol (IP) address of a computer device participating in the first online meeting, a meeting title, a name designated as the first online meeting host, or a URL associated with the first online meeting, to name a few examples.

The meeting server stores the document in the first online meeting repository 306. A network-connected first computer device 310 is able to log into the meeting server 302 and access the document 308 from the first online meeting repository 306 at a time prior to, during, or after the first online meeting. Although the first online meeting is depicted as an entity separate from the network 304, it should be understood that such a meeting would typically be enabled using WAN and/or LAN connections between participants. An online meeting is also enabled as a sequence of software instructions stored in a computer readable memory and executed by a processor in at least one of the meeting participant computer devices.

In one aspect, the first computer device 310 accesses the document 308 while participating in the first online meeting, and presents the document into the first online meeting. Alternately, any of the other meeting participants, such as the second computer device 312 or the third computer device 314, are able to access the document 308 and present it. The computer devices may be a device with Internet access capabilities, such as PCs, mobile phones, or personal digital assistants (PDAs), to name a few possible examples.

In another aspect, the second computer 312 receives an invitation to the first online meeting with the first communication address coded into the invitation, and sends the document 308 to the first communication address when accepting the invitation. By "coded" it is meant that the user of the second computer device 312 may not be able to see the address in the presentation of the request, but the second computer device is able to detect the embedded address, with instructions to send the document to the address.

In one aspect, a fourth computer device 316, not participating in the first online meeting receives a document request from the first computer device 310, and sends the document to the first communication address. Again, the document request can be received with the first communication address coded into the request. For example, the fourth computer device 316 may be a 1G mobile phone or printer (MFP), or a device whose Internet access to the meeting is blocked by a firewall.

In another aspect, the meeting server 302 establishes a plurality of categories associated with the first online meeting, and subsequent to receiving the document, associates the document with one of the first online meeting categories. Example categories and exemplary categorization methods are presented in detail below.

The meeting server 302 may also accept a recurring first online meeting schedule comprising a first meeting segment and a second meeting segment, and receives the document 308 requested in response to a first meeting segment action item. In one aspect, the meeting server 302 schedules the second meeting segment, or sends a request to the meeting organizer to schedule the second meeting segment, in response to receiving the document 308.

Functional Description

In the exemplary operating environment, an online meeting is scheduled with a meeting service. The online meeting service may be enterprise hosted or hosted by a third party service. When the meeting is scheduled (or thereafter), one or more attendees are requested. Each attendee has an email address associated with them. A meeting request is then sent to the email address of each attendee. Each attendee receives the email message via an email client running on a computing device, such as a PC, laptop or mobile device. The computing device from which the user operates the email client can additionally store or access documents, and send documents as attachments via email.

The meeting request typically contains information on the meeting (title, agenda, time/date), and a link to access the specific meeting. Note, the later is typically done as an URL hosted by the service, whereby the URL additionally identifies the meeting via a unique meeting PIN and identifies the user by a unique user PIN. Below is an example:

http://www.meetingsareus.com/meeting.php?meeting=75647&user=78334

Each attendee receives the email message via an email client (e.g., MS Outlook) running on a computing device, such as a PC, laptop, or mobile device.

Using the system of FIG. 3, a document can be emailed into a "live" or scheduled multi-user/multi-site online meeting for presentation and collaboration. The user does this by sending the document as an email attachment, to an email address associated with the live or scheduled online meeting. Upon receipt of the document, the online meeting service may: convert the document to a presentation format, store the document in a meeting repository, send the document to one or more meeting attendees, or present the document for application sharing (either at the service or remote PC).

In one aspect, the user sends the document to a "temporary" email address associated with the online meeting. For example, when the meeting is scheduled, the service assigns the meeting a meeting PIN to uniquely identify the meeting. The service would then create an email account for this meeting PIN, such as:

<meeting_pin>@meetingservice.com.

In another aspect, the user sends the document to a predefined email address associated with the meeting service, and identifies the meeting within the email, such as in the subject or body. The meeting may be identified through a variety of means, such as a meeting PIN, the IP address of the presenter, meeting title, or meeting host.

In another aspect, the user sends the email attachment by replying back to the email invite message sent by the meeting service. The original email message sent by the service has coded in it a meeting identifier which the meeting service can parse out when the message is sent back as a reply. The system of FIG. 3 provides a means to share a document from a device that has limited capability, such as one that does not have web browser capabilities, but has email capability, or one that does not have access to the Internet, but does have email access. The system also provides a means to share a document transmitted from a peripheral device which does not have Internet capability, but has email capability (e.g., MFP). The system provides a means to preload documents to share in a scheduled meeting using a third party calendar program.

In another exemplary operating environment, an online meeting is scheduled with a meeting service. The online meeting service may be enterprise hosted or hosted by a third party service. When scheduling a meeting, the user performs typical tasks with scheduling an Outlook meeting, including: 1) setting time and location, 2) inviting attendees, 3) selecting a room resource, and 4) sending invites to the attendees. The user may also preload content for presentation in the meeting as part of the scheduling task.

Each invited attendee has an email address associated with them. A meeting request is then sent to the email address of each attendee. Each attendee receives the email message via an email client running on a computing device, such as a PC, laptop or mobile device. The computing device from which the user operates the email client can additionally store or access documents, and send documents as attachments via email.

The host starts the online meeting at the scheduled time. Once started, the attendee's join the meeting. Typically, the email invite to the attendee's contains an URL, which when clicked, automatically joins them to the meeting. Other methods of sending invites to the attendees could include: IM and SMS (e.g., mobile testing).

Figure 4:
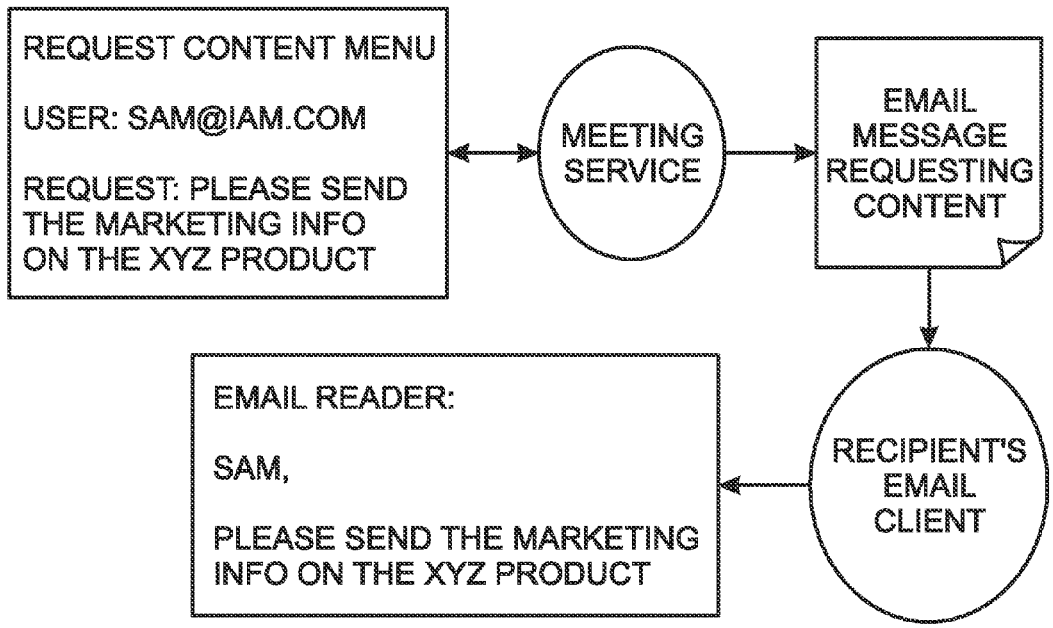
FIG. 4 is a schematic block diagram depicting an exemplary document request.

FIG. 4 is a schematic block diagram depicting an exemplary document request. The system of FIG. 3 permits a meeting host, presenter, or other meeting participant with authority, to make a request for content from a non-meeting participant. In one aspect, the participant selects a menu button from the online meeting UI (e.g., desktop or browser application) to select or enter a non-meeting participant. In one case, the user can browse and select from a predetermined list of non-meeting participants. For example, this list might come from: the global address book for the organization; the participant's personal address book; or, a set of pre-identified non-meeting participants specific to the online meeting.

Alternately, the participant may enter the electronic contact address (e.g., email or IM) of the non-meeting participant. Once the non-meeting participants have been selected, the participant enters additional information on what content is being requested. The online meeting service then constructs an electronic message to each selected non-meeting participant for the requested content and sends the message to each non-meeting participant's electronic contact address.

When the non-meeting participant is ready to send the requested content to the meeting, the non-meeting participant responds to the email message and adds the content as an attachment(s). The original email request may contain an embedded identifier in the message which uniquely identifies the online meeting for which the request is made for. Upon receipt of the response, the online meeting service parses the response and extracts the content (from attachments) and the unique meeting ID (e.g., from subject or body). The content is then added to the online meeting associated with the unique meeting ID.

Figure 5:
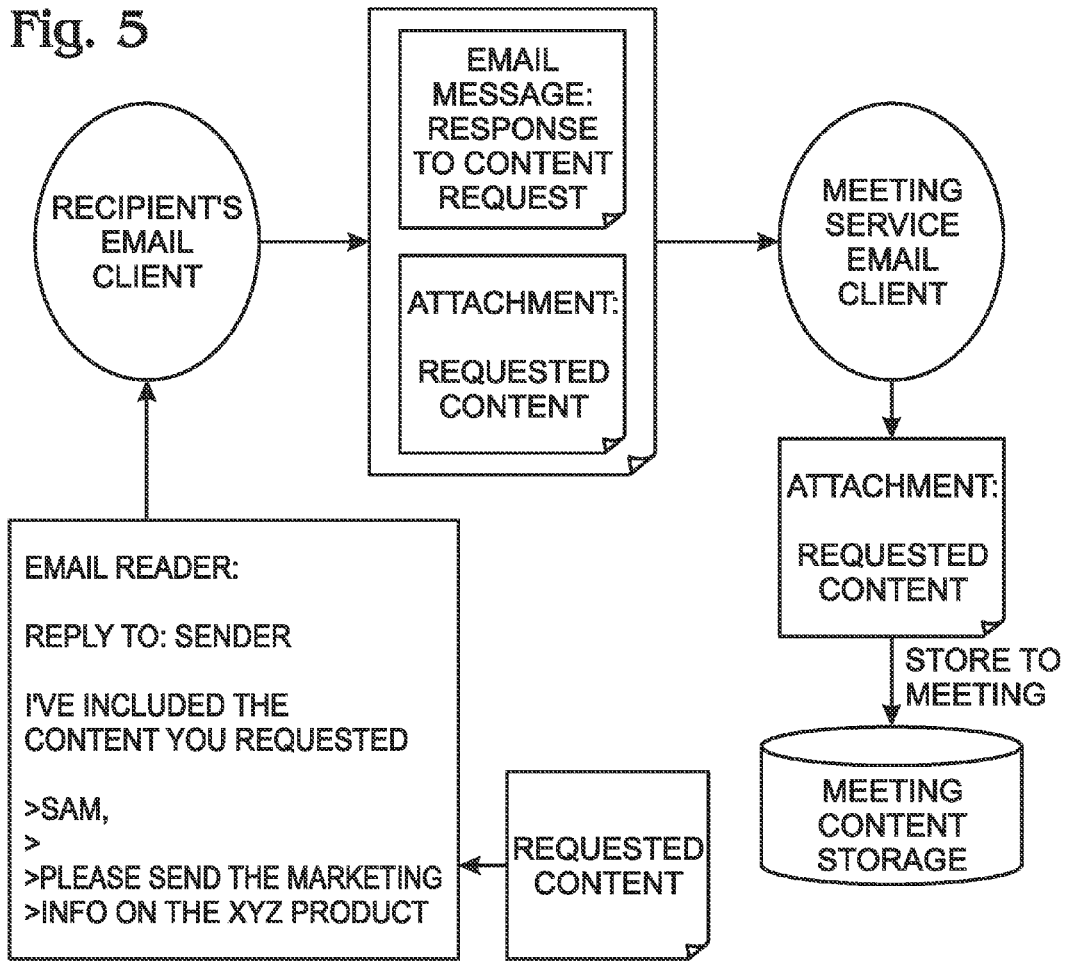
FIG. 5 is a schematic block diagram depicting an exemplary process for storing requested content.

FIG. 5 is a schematic block diagram depicting an exemplary process for storing requested content. The request for content may occur prior to a meeting (stored in a pre-meeting repository, during the meeting (stored in a launch area), or after the meeting (added to available meeting documents).

In another aspect, the content request may be specific to a category or activity within the meeting. For example, the request might be specific to: summary information; status; or, statements. In this case, the content requesting email would be further augmented to indicate the category. For example, the embedded meeting ID may be appended with a textual string indicating the category associated with the content request. In another example, each content requesting email has a unique identifier which is stored in a database, along with a set of actions associated with the content request.

Upon receipt of a response to a content request, the meeting service determines both the specific meeting and specific category from the embedded identifier. The content is then routed to the identified meeting, and processed according to the category type. For example, a status category may cause the content to be added to a spreadsheet showing the status of particular staff on a project.

In another aspect, the meeting is part of a series or otherwise recurring meeting. Information from one meeting segment may be carried forward to the next or otherwise subsequent meeting segment. In preparation for the next or otherwise subsequent meeting, a request may be made for content that will be reviewed or otherwise processed during this next/subsequent meeting. In one example, the content request is part of a cross-meeting action item list. In this example, when a meeting segment ends, the meeting participants construct an action item list of actions that need/ should occur before the next/subsequent meeting segment. In this case, the embedded identifier in the email content request would identify the action item as well as the associated meeting. When a response is received to the content request, the content is added to the specific action item and the action item status is updated. The host or meeting organizer can then query or be informed on the completion status of the action item list prior to the next/subsequent meeting segment. An intelligent rescheduling process may also alter the time of the next/subsequent meeting segment based on the completion status of the action item list and attendee availability.

Thus, the system provides a means to request content during (before/after) an online meeting from non-meeting participants. The request and response for content is asynchronous to the meeting, and does not pause or otherwise disrupt the flow of the meeting. An action item list may span across continuous meetings, where individuals (both meeting and non-meeting participants) can update between meeting segments.

As noted above, a user can email one or more documents into a "live", scheduled, or completed multi-user/multi-site online meeting for presentation and collaboration. The user does this by sending the document(s) as an email attachment, to an email address associated with the "live", scheduled; or completed online meeting. The documents may be of any format which is compatible with the online meeting service. For example, the format may be one that can be imported and presented by the meeting service (e.g., MS PowerPoint and Adobe PDF formats are importable into WebEx and DimDim). The format may be one that can be loaded into a view/edit application hosted by a designated presenter, and the application view can be shared with the attendee (e.g. Application Sharing in WebEx). The format can be that is able to distributed and loaded by each attendee into a distributed application; whereby the document presentation/editing can be synchronized across the plural attendees by the distributed application.

Upon receipt of the document, the online meeting service may convert the document to a presentation format. For example, the document can be converted from an offline format (e.g., MS PowerPoint) into an online presentation format (e.g., Adobe Flash format) using a direct conversion process (e.g., WebEx importation of MS PowerPoint). The document can be converted from an offline format (e.g., MS Word) to a web publishing format (e.g., HTML) using a print application and associated printer driver. The document can be stored in an online document repository associated with the specific meeting (e.g., Google Docs).

FIG. 6 is a flowchart depicting an exemplary document transmission process. Documents can be sent to one or more meeting attendees. For example, the document may be distributed by: email attachment, FTP to attendee's registered FTP server, HTTP file download via the attendee's web browser or Internet enabled application, SOAP/XML Web Service call a web service process running on the attendee's computing device, sent to an online document storage associated with the attendee, presented for application sharing (either at the service or remote PC), or launched in a viewing/editing application whose application window is displayed to, a virtual display, whereby the virtual display is shared with the attendees (e.g., VNC or Remote Desktop). Otherwise, the document can be sent to an online meeting application running on the attendee's computing device with a request to load the document into a compatible view/edit application accessible to the attendee's computing device, and then the application window is shared with the online meeting service. In return, the meeting service may then share attendee's application window with the remaining attendees.

Any means may be used by the presenter/attendee and online meeting service to determine from the email message the specific meeting into which the documents are to be loaded.

FIG. 7 is a flowchart illustrating an exemplary email reply process. In one aspect, the presenter/attendee replies back to the invite email message sent by the online meeting service, and attaches the documents as email attachments to the replied message. The email meeting invite message constructed by the online meeting service contains a meeting specific identifier which can be recognized by the service when the message is replied to. Any means of identification may be used. The identifier may be embedded in the message body. For example, the email message may contain an URL link for the user to host or join the meeting. The URL would contain identifier(s) unique to the meeting. Examples of unique identifier in the URL include: a unique URL address specific to the meeting:

http://www.meetingservice.com/yourmeeting123;

or a unique meeting ID added as an URL argument:

http://www.meetingservice.com/meetings.php?id=1234.

The identifier may be embedded in the message subject. For example:

Subject: Your invited to an online meeting—ID 1234.

The identifier may be constructed as an email address. In this case, the meeting service creates a temporary unique email address specific to the meeting. Typically, the temporary email address is valid until the end of the meeting and possibly some predetermined duration afterwards, such as for retrieving summary or history information on the meeting. In some cases, the validity of the temporary email address may be extended past a first predetermined duration, such as by an authorized request or additional payment. For example, the email address may be:

Meeting1234@meetingservice.com.

In another method, the user constructs a new email message to send to the online meeting service. The user attaches the documents to share to the email message. The user then sends the email message with the document attachments to the online meeting service. The method may use any means for the user to identify the specific meeting to load the documents into and for the meeting service to recognize the meeting specific identifier in the user's email message.

In another aspect, the user specifies the meeting identifier as part of the subject line. The meeting identifier may be a meeting PIN assigned to the meeting, which may have been obtained from the email invite message or other scheduled meeting notification (e.g., online). The meeting identifier may be unique identifier assigned to the meeting's host, such as a meeting service social name, a communication address unique to the meeting's host (e.g. IP address), or the title of the meeting.

Figure 8:
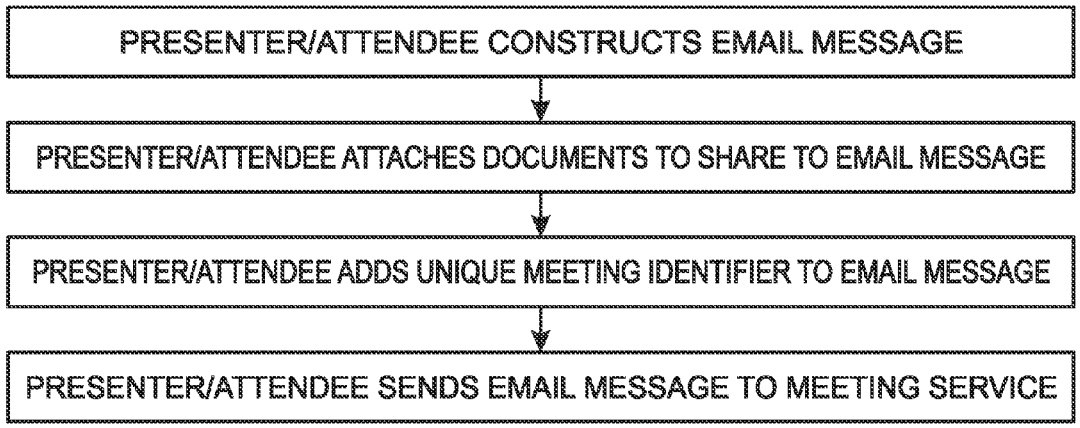
FIG. 8 is a flowchart illustrating a method of adding a meeting identifier to an email message.

FIG. 8 is a flowchart illustrating a method of adding a meeting identifier to an email message. The user may specify the meeting identifier in the body of the message, in such a manner that can be recognized by the meeting service. For example, the identifier can be the first line in the message body, or prepended by keyword (e.g., MTGID).

Another feature of the system is that the meeting service receives the email message with the documents to share as an attachment. The meeting service may receive the email messages by any means, such as those means described above.

In one aspect, the meeting service has an email client that reads email messages from an email server (e.g., Microsoft Exchange Server) associated with the email client (e.g., POP3 client). The meeting service's email client automatically reads messages sent to the email addresses associated with the meeting service. For example, the email client polls the email server for new messages on a periodic basis (e.g., every 30 seconds).

When the email client reads a new email message, the email client parses the message to determine the unique meeting ID (such as specified in the above methods). If the meeting ID cannot be identified, the email client passes the email message to an error handler or to another meeting service related workflow. If the meeting ID is identified, the email client determines if the email message is valid for the service. This validation may include verifying that the meeting ID is associated with a valid meeting, or determining that the email sender is authorized to send a document to the meeting. Otherwise, verification determines if the meeting ID has been sent from an email address associated with the host or an attendee, or otherwise an authorized user of the meeting account. Or, a meeting-specific password can be parsed and verified.

If the request is validated, the meeting service then extracts the attached documents. Each document may additionally be verified, to determine if: the document format is supported by service; the document size does not exceed some predetermine limit to the meeting or account holder for the meeting; or, the document content does not contain data not allowed by the meeting service (e.g., illegal content, spam, etc).

If the validation tests fail, the meeting service may additionally send an email reply back to the email message indicating that the document(s) were not accepted, and the reason for non-acceptance.

One example of parsing an email message can be demonstrated by using the open source code OpenPOP, which can be configured to be a POP3 email client. The POP3 email client can be initiated as a background thread and configured to connect to (POPClient.Connect( )) an email server (e.g., MS Exchange) associated with the email account of the meeting service, and log into the email account (POPclient.Authenticate( )). The POP3 email client can then periodically query the email server for new messages (n=POPClient.GetMessageCount( ), msg=POPClient.GetMessage(<n)). The POP3 email client can then obtain the subject, body and document attachments from the message (msg.Subject, msg.MessageBody, msg.Attachments). The corresponding data can then be parsed according to its data type (e.g., string) and examine for keywords or a predetermined structure (e.g., IP address format in subject line—<nnn>.<nnn>.<nnn>).

One example of identifying a scheduled, completed, or live meeting from the extracted information can be demonstrated using an API interface between the email client and then meeting scheduler, and using the extracted information as parameters for a SQL database query, where meeting information for scheduled, completed, or live meetings are stored. For example, each meeting could have a row entry in an SQL database, with a unique identifier (such as a 128 bit GUID) as a primary key. The row may contain other non-primary key fields relating to the meeting which could be used to identify the meeting, such as the organizer name, meeting title, meeting time, meeting location, IP address of the host PC when the meeting is live.

The extracted information could then be one or more of the non-primary key values, which are then passed via an API call (GetMeetingGUID(field1-value, field2-value, . . . ) to the meeting scheduler. A single API call could handle a variety of different field combinations, either by function overloading (C++/C#) or encoding the field with the field value:

```
// Example of function overloading
//
String guid1 = GetMeetingGUID( title );
String guid2 = GetMeetingGUID( title, organizer);
// Example of encoding field identification
//
String guid1 = GetMeetingGUID( "Title = ".Append( title ) );
String guid2 = GetMeetingGUID( "Title = ".Append( title ) . ",
Organizer = ".Append( organizer) );
```

The meeting scheduler can then use the field=value parameters to make an SQL query to return all the rows that match the criteria. For example (C#/.Net 3.5):

```
// Create the connection and a command object
DBConn.Open( );
SqlCommand SqlCmd = DBConn.CreateCommand( );
// Construct SQL query
//
string sqlCmd = @"SELECT * FROM MeetingsTable WHERE
  title = '"
+ title + "' AND organizer = '" + organizer + "'";
SqlCmd.CommandText = sqlCmd;
// Query the SQL database
//
SqlDataReader MtgListReader = SqlCmd.ExecuteReader( );
// Meeting not found
//
if ( MtgListReader.Read( ) == false )
  return null;
```

```
// Get the meeting's primary key
//
Guid guid = MtgListReader.GetGuid(0);
```

Figure 9:
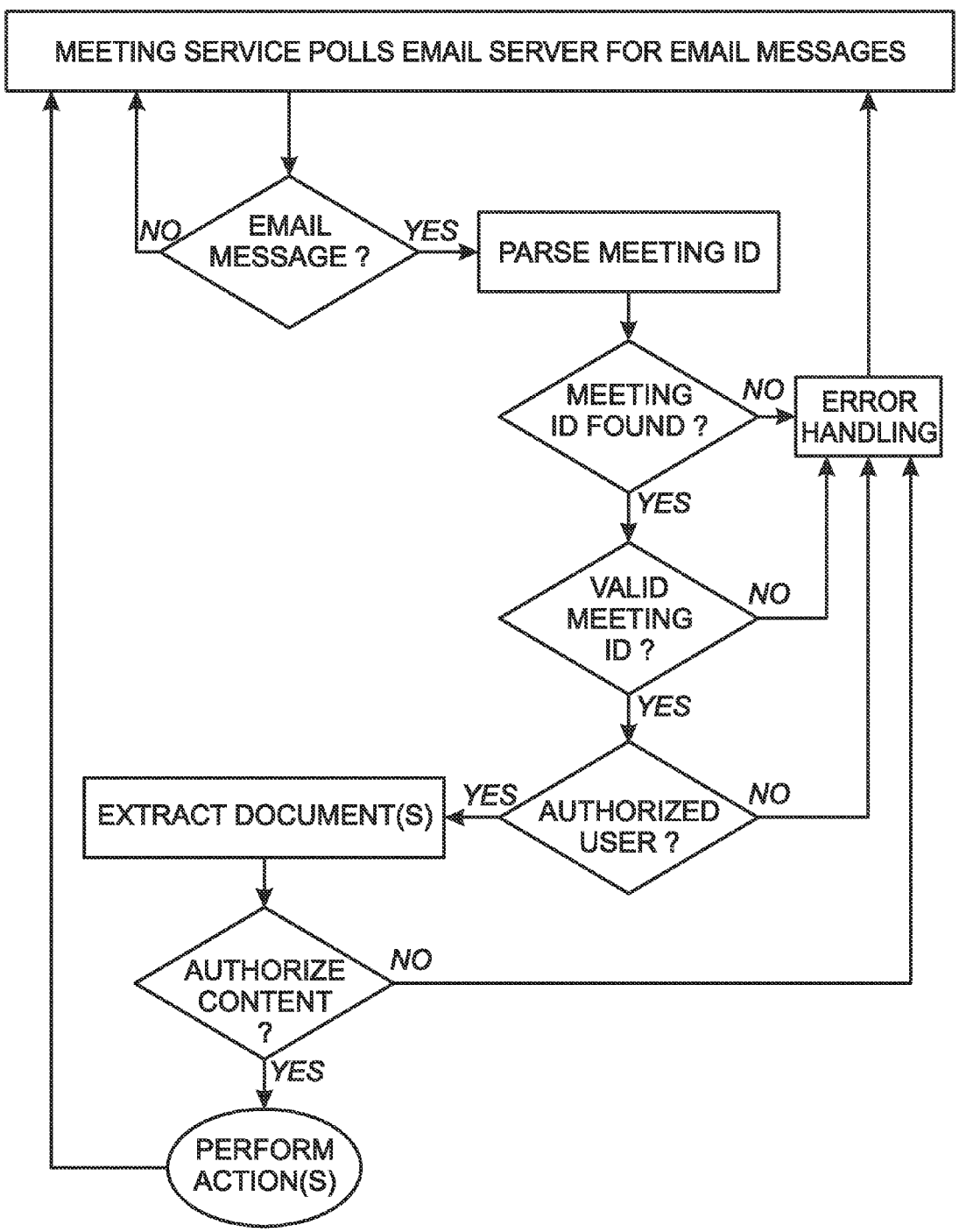
FIG. 9 is a flowchart illustrating a method for verifying a valid email message.

FIG. 9 is a flowchart illustrating a method for verifying a valid email message.

The meeting service may perform one or more actions on each document extracted from the meeting service. The determination of the actions to perform may be based on any reason, such as: predetermined actions; document type (e.g., conversion vs. application sharing); meeting type; settings specified in the scheduled meeting; settings specified in host preferences; actions specified in email message (e.g., command keywords).

In another aspect, a user of the meeting service makes a request for content from a non-meeting participant. A non-meeting participant is an individual or software application represented by an electronic communication address, who is not an invited attendee of the meeting. In some cases, request for content from a non-meeting participant is restricted to the meeting organizer. In other cases, the meeting presenter(s) and/or attendee(s) can make the request. In other cases, the request may be made as an automated process as a result of an activity event which occurred in the setup, execution or completion of the online meeting (such methods will be discussed in detail below).

The request for content may be made at anytime during the lifecycle of the meeting, such as: when the meeting is scheduled; after the meeting is scheduled, but before it starts; during the meeting; after the meeting has ended and the meeting is archived; and, between meeting segments in an asynchronous (recurring) meeting.

When a request for content is made to a non-meeting participant, the online meeting service sends the request to an electronic communication address associated with the non-meeting participant. In one aspect, the communication address is an email address. Alternate communication addresses include an Instant Message (IM) address or SMS address.

Figure 10:
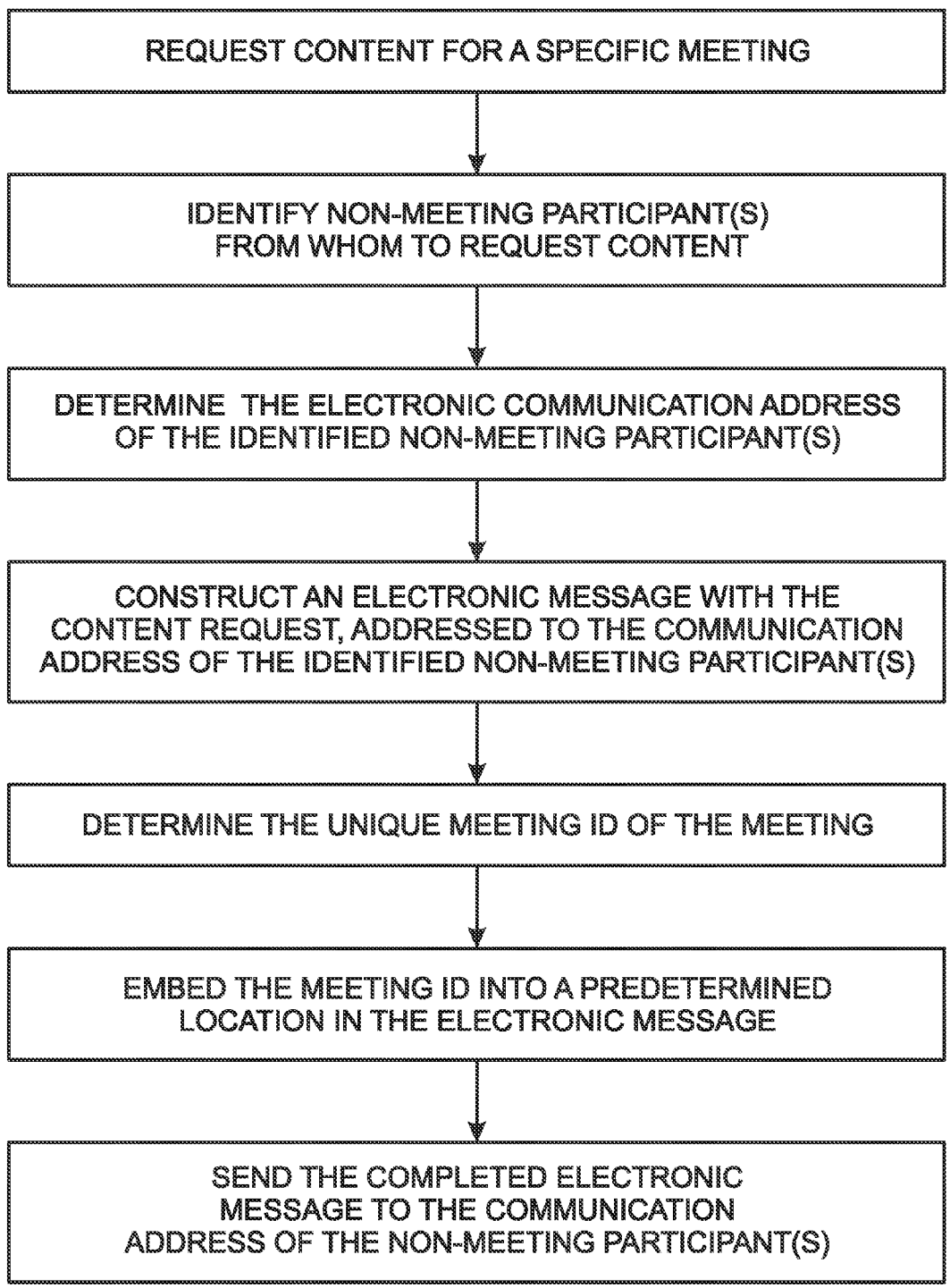
FIG. 10 is a flowchart illustrating an exemplary process for requesting content for an online meeting.

FIG. 10 is a flowchart illustrating an exemplary process for requesting content for an online meeting. The request message contains an embedded identifier to identify which meeting the request for content is being made for. For example, the identifier may be a 36-byte globally unique identifier (GUID). The identifier may be embedded in the title of the message, the subject of the message, or in a non-visible portion of the message (e.g., metadata).

Below is an example code excerpt demonstrating an implementation of constructing the content request, determining the communication address of the non-meeting participant and sending the request to the non-meeting participant:

```
// Read the request for content entered into the request form UI
  string request = requestMenu.Request.Text;
  // Read the identified user to send the request for content to
  string user = requestMenu.User.Text;
  // Determine the communication address of the identified user
  string recipient = addressBook.Email( user );
  // Construct subject line for email message request and embed
meeting ID
  string subject = "Request for Content for Meeting: " +
meetingInfo.GUID;
  // Construct email message
  MailMessage msgMail = new MailMessage
```

-continued
```
(meetingServiceEmailAddr, recipient);
    msgMail.Subject = subject;
    msgMail.Body = request;
    msgMail.Charset = "ISO-8859-1";
    msgMail.Priority - MailPriority.High;
    msgMail.Notification = true;
    try
    {
        Smtp smtp = new Smtp(emailServer, emailUser, emailPassword, SMTPPort);
        smtp.SendMail(msgMail);
        return true;
    }
    catch
    {
        return false;
    }
```

Upon receipt of the request at the non-meeting participant's communication address, the non-meeting participant can provide the content by replying to the electronic message (e.g., email message). The non-meeting participant may provide (or identify the location of) the content by: attaching the content as a document (electronic file) to the electronic message; specifying the content as a text description in the message body; or, providing a link (e.g., URL) to the content in the message body.

Figure 11:
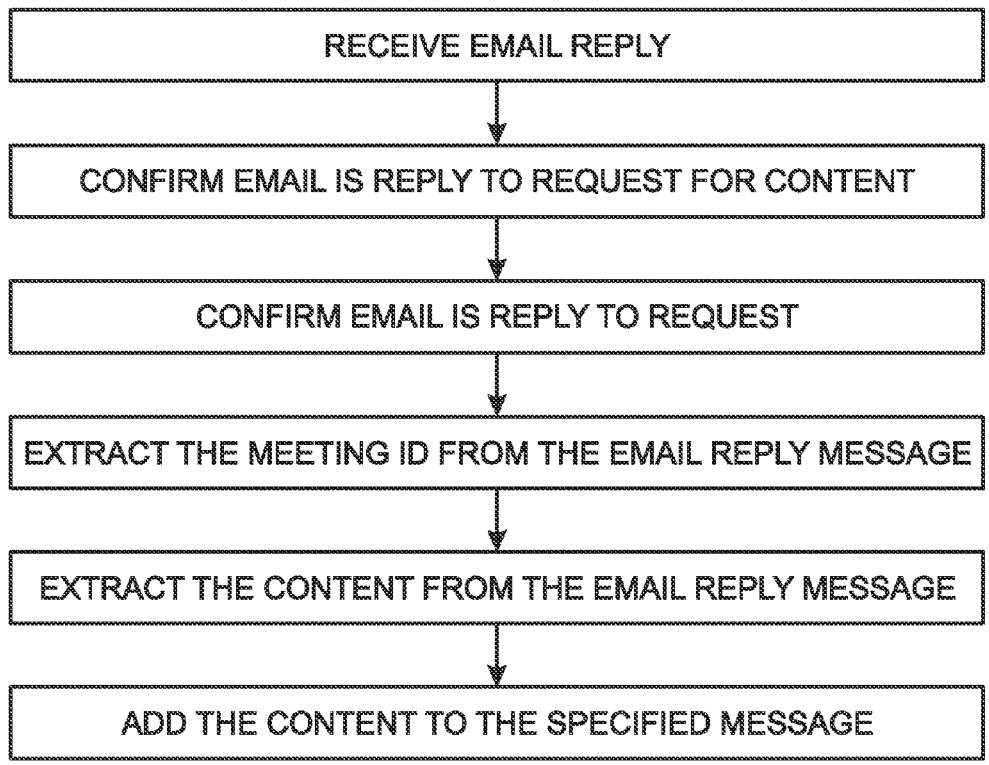
FIG. 11 is a flowchart illustration an exemplary process for extracting content and a meeting ID from an email reply.

FIG. 11 is a flowchart illustration an exemplary process for extracting content and a meeting ID from an email reply. Upon receipt of the reply to the electronic message, the online meeting service: 1) identifies the responding non-meeting participant (e.g., from email address in email message); 2) identifies the meeting that the request for content was made for (e.g., 36 byte GUID in email subject line); 3) determines how the content is provided in the electronic reply message (e.g., attachment, textual, link); 4) extracts the provided content; and, adds the extracted content to the identified meeting.

The process may also perform additional steps, such as: authenticating the sender; validating the content as permissible; decrypting the content, or encrypting the content during storage; compressing and/or reducing the content; translating (language) the content to another natural language; or, converting the content to another electronic data format (e.g., MS-Word to JPEG images).

Below is an example code excerpt demonstrating an implementation of processing a reply to a request for content, determining the meeting ID, extracting the content and storing it in a meeting folder associated with the meeting:

```
// Get the entire email message
//
msgMail = popClient.GetMessage( i, false );
// Decode the message
//
if ( null != msgMail )
{
        // Read and Process the Email Message
        //
        ReadEmail re = new ReadEmail( msgMail );
        ReadEmail.ReadResult readResult = re.Parse( );
}
...
// Parse an Email Message
//
public ReadResult Parse( )
{
        ...
        // Do first pass over email attachments
        //
        if ( !Pass1( ) )
            return ReadResult.NoMeeting;
        // Process by Meeting message type (set by Pass1( ))
        //
        switch ( msgType )
        {
                ...
                // Reply to a Request for Content
                case MeetingMsgType.ReplyTo:
                        res = ReadResult.Uploaded;
                        break;
                ...
        }
        // Handle File Attachments in Meeting Notices/Replies
        //
        if ( false == Pass2( ) )
            return ReadResult.NoMeeting;
        ...
}
private bool Pass1( )
{
        // Precheck Pass for each Attachment
        //
        for ( int i = 0; i < atlist.Length; i++ )
        {
                try
                {
                        bool checkForReply = false; // flag indicating to check if attachment is a reply to meeting notice
                        string attachmentData = atlist [ i
```

```
].RawAttachment;
                                switch ( atlist[ i ].ContentType )
                                {
                                    ...
                                    // Content may contain meeting related information
                                    case "text/html":
                                    case "text/plain":
                                        checkForReply = true;
                                        break;
                                    // Email Message Read return notification
                                    case "message/disposition-notification":
                                        msgType = MeetingMsgType.ReadNotify;
                                        return true;
                                }
                                // Look for Reply to Calendar Notification
                                if ( true == checkForReply )
                                {
                                    try
                                    {
                                        // Check if this is a Reply to Meeting Notice
                                        //
                                        MeetingMsgType var;
                                        string strTitle = IsReplyTo( attachmentData, atlist[ i ].ContentType, out var );
                                        if ( null != strTitle )
                                        {
                                            msgType = var;
                                        }
                                    }
                                    catch
                                    {
                                        // Parsing error OR non-existent meeting
                                        return false;
                                    }
                                }
                            ...
    }
    private string IsReplyTo( string rawAttachmentData, string contentType, out MeetingMsgType msgType )
    {
                ...
                // Look for meeting GUID in the email subject line
                //
                if ( meetingGUID == null )
                        meetingGUID = MeetingGUID ( strSubject );
                ...
    }
    private bool Pass2( )
    {
                // Construct Document Folder for meeting
                //
                meetingDirectory = strDocumentStorage + "\\" + meetingGUID;
                if ( Directory.Exists(meetingDirectory) == false )
                    Directory.CreateDirectory( meetingDirectory );
                // Save the attachment to the Document Store
                //
                for ( int i = 1; i < atlist.Length; i++ )
                {
                    // Not a file attachment
                    //
                    if ( atlist[ i ].ContentFileName == "" )
                        continue;
                    // construct file path to store document in meeting document folder
                    //
                    string filePath = meetingDirectory + "\\" + atlist[ i ].ContentFileName;
                    // Save document locally
                    //
                    if ( false == emailMessage.SaveAttachment( atlist[ i ], filePath ) )
                    {
                            continue; // error
```

```
        }
    }
    return true;
}   // Pass2( )
```

In one aspect, the request for content is made prior to the start of the meeting. For example, the requester (e.g., host) logs into (e.g., username/password) a meeting management process for the online meeting service and authenticates themselves as a user of the meeting service. The meeting service then presents to the authenticated user a UI which shows all the meetings that the user is a participant (host, attendee, presenter, etc). For example, the UI may be presented as a dropdown selection box in an HTML form.

The user then selects the meeting for which they want to request content for. For example, the user may select a meeting entry from the drop down list of meetings and select the button associated with the 'submit' input type for the HTML form. Once the submit button is selected, control is passed to the web page specified in the action attribute of the form tag. Below is an example:

```
<!—drop down list of meetings -->
<span>List of Meetings</span>
<form name="Select.Meetings" action="meetinginfo.php"
method="post" >
    <select name="meeting">
        <!— server code to obtain meetings from the database
that the user is
            a participant of, and then populate the option
selections of the HTML
            Select input control -->
        <?php
            meetings = $database.getMeetings( $user );
            foreach ( $meetings as $meeting )
            {
                echo "<option
name='$meeting'>$meeting</option>";
            }
        ?>
    </select>
    <!—submit meeting selection button -->
    <input type="submit" value="Get Meeting Info">
</form>
```

A web page called as the action would then display the meeting information for the specific meeting and additionally display one or more action forms. One action form would be to request content for the meeting from another user. When selected, the user may be presented with a form in which the user inputs the email address (or name from an Address Book) of the other user and a message indicating what they are requesting. When the user selects the input button with the type attribute submit, then the web page specified by the form's action attribute is called.

The called web page would then take the information posted in the form and pass it to a RequestContent( ) function that is executed on the server side. The RequestContent( ) function would then invoke the process described earlier. Below is an example:

```
Meetinginfo.php:
    <!—meeting information display -->
    <div style="float: left; border: 1px solid black;">
        <h3>Meeting Information</h3>
        <span>Meeting Name: Meeting A</span><br/>
        <span>Meeting ID: 1234567890-abcdef</span><br/>
        ...
    </div>
    <!—form to request content for the meeting from another user -->
    <div style="float: left;">
        <h3>Request Content for Meeting</h3>
        <form name="RequestContent"
            action="request_content.php?meetingID=1234567890-
abcdef">
            <!—enter email address of person to make the request
to -->
            Email Address:
            <input name="EmailAddr" type="text" />
            <!—enter message (request) to send to user -->
            Request:
            <textarea name="Request" rows="8"
columns="20"></textarea>
            <!—submit content request button -->
            <input type="submit" value="Request Content" />
        </form>
    </div>
request_content.php:
<?php
    // Get Request entered by User and Meeting ID
    $emailto = $_POST[ 'EmailAddr' ];
    $message = $_POST[ 'Request' ];
    $meetingID = $_GET['meetingID'];
    $subject = "Please send the following info for the meeting:
ID=${meetingID}";
    // Send the email message requesting the content
    Sendmail( $emailform, $emailto, $subject, $message );
?>
```

FIG. 12 is an exemplary rendering of an HTML form suitable for requesting meeting content.

In another embodiment, a meeting participant makes a request for content from a non-meeting participant during the online (live) meeting. In one aspect, the participant is running a meeting application, which may be an online application (e.g., ran within a web browser), an offline application (e.g., desktop application) or a combination of an online and offline application, where the offline application acts as a bridge to the online application.

Figure 13:
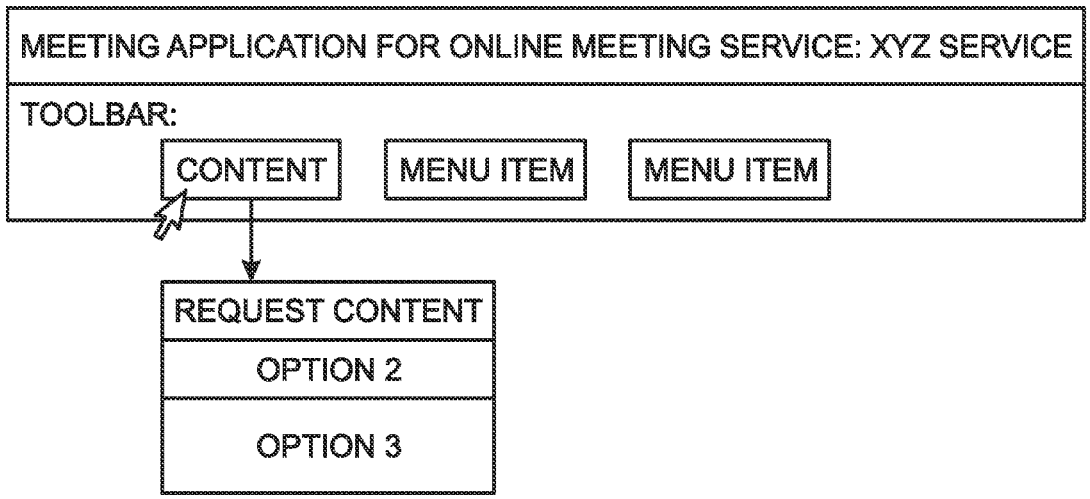
FIG. 13 is an exemplary pull-down menu for requesting meeting content.

FIG. 13 is an exemplary pull-down menu for requesting meeting content. From within the meeting application, a participant (e.g., organizer, presenter, or attendee) selects a menu option to request content from a non-meeting participant. For example, the menu option may be a pull down menu on an option toolbar, labeled 'Content'. The participant then selects an option (e.g., 'Request, Content') on the pull-down menu that causes another menu to appear from which the participant can make a request for content from a non-meeting participant.

The 'Request Content' menu may contain at least two input fields: 1) person to make request to, and 2) what is being requested. In the first field, the participant identifies the non-meeting participant to send the request to, such as a pre-known person selected from an Address Book which additionally contains an electronic communication address for the person for sending the 'request for content' message. Otherwise, there may be an input field for the participant to enter the electronic communication address (e.g., email) of the non-meeting participant. In the second field, the participant enters a textual description of the content they are requesting. Alternately, the participant may select a predefined textual message from a list of messages or keywords associated with the predefined messages. When completed, the participant selects a 'Send' button to send the request to the non-meeting participant. When selected, the meeting application sends the entered information to the meeting service. The information may be sent by any means, such as a Web Service call when the application is an offline desktop application, or an HTTP post when the application is an online application.

The online meeting service constructs and sends the request for content message to the identified non-meeting participant. The constructed message is addressed to the non-meeting participant's electronic communication address, with a textual description of the request. An embedded identifier uniquely identifies the meeting to which content is submitted. The message also gives an indication of whom (and optionally their role) is making the request.

When the non-meeting participant receives the request, they may send the requested content by including the content in a reply to the electronic message requesting the content, as described earlier. When the meeting service receives the replied message containing the content, the meeting service extracts from the message the content and the embedded meeting identifier, as described earlier. Once the content is extracted and the meeting identified, the meeting service provides the content to the specified 'live' meeting, such as: storing it in a content repository specific to the meeting, where it is immediately selectable for viewing/editing; or, informing the participant of the content arrival and asking if participant would want to immediate view/edit the content. Otherwise, a copy of the content may be sent to some or all meeting participants.

In another aspect, a meeting participant makes a request for content from a non-meeting participant after an online meeting has completed. The meeting participant, or other authorized individual, makes the request via a meeting scheduling application. The authorized individual may make the request in the same manner as described prior to a meeting, except that the user is selecting a completed meeting.

Once the user has completed submitting the information for the requested content, the meeting service constructs and sends an electronic message to the non-meeting participant requesting the content. The request may be made in the same manner as described in making a request prior to a meeting. When the non-meeting participant receives the request, they may send the requested content by including the content in a reply to the electronic message requesting the content, as described earlier.

When the meeting service receives the replied message containing the content, the meeting service extracts from the message the content and the embedded meeting identifier, as described earlier. Once the content is extracted and the meeting identified, the meeting service adds the content to the recorded or otherwise persistent archive for the meeting. In one case, the recorded archive contains a link to a post-meeting collection of documents. A user viewing the recorded archive has the option to select viewing content in the post-meeting collection. Typically, the post-meeting content is stored on a file-system, and generally grouped under a single directory folder. The database (or stored recording) contains a link to the directory folder containing the post-meeting content.

Figure 14:
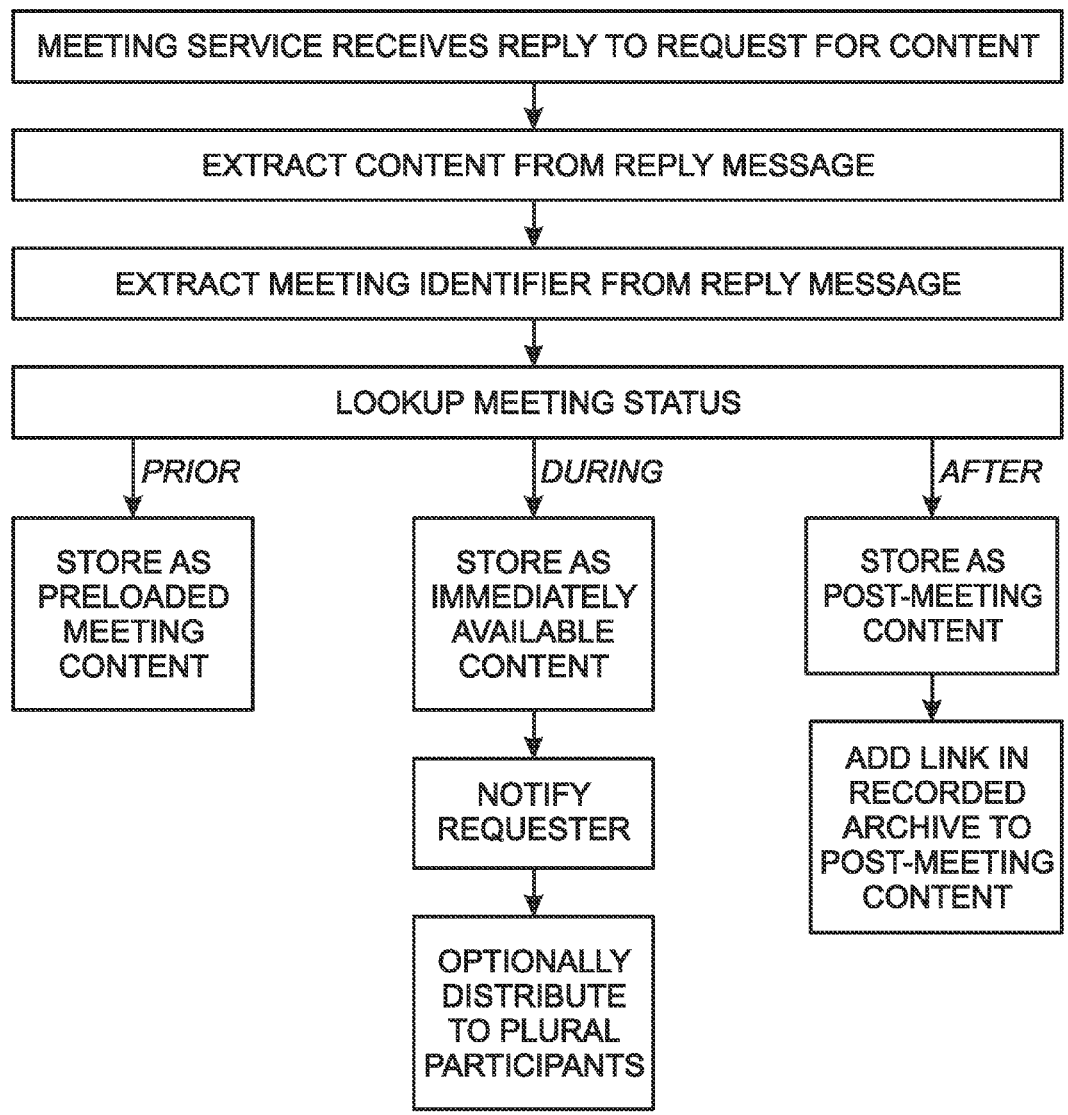
FIG. 14 is an overview depicting how received content is handled.

FIG. 14 is an overview depicting how received content is handled.

In an alternate aspect, a request for content may be further augmented as a request to a specific category or topic. For example, the request may be related to a specific topic on the agenda, or to a general category of information, such as the participant's status on the subject being discussed. In this case, the request is specific to a topic in the agenda. The meeting service allows the meeting organizer to include separate and distinguishable topic items to the agenda. For example, the scheduling process may involve an introductory statement, an item by item entry of topics to discus, or a conclusion—goal of the meeting, or what's next.

In one example, the above-mentioned function is implemented as a web page. The web page may contain a form for inputting the above. In a simple form, the introductory and conclusion statements have a single input control each, while the item by item may consist of a fixed number of input controls, one per item. Below is an example HTML code:

```
<h3>Agenda</h3>
<!--Meeting Scheduling Form -->
<form name="agenda" action="schedule_meeting.php" method="post">
     <input name="introduction" type="text" />
     <input name="conclusion" type="text" />
     <!--upto 5 agenda topics may be entered -->
     <input name="item1" type="text" />
     <input name="item2" type="text" />
     <input name="item3" type="text" />
     <input name="item4" type="text" />
     <input name="item5" type="text" />
     <!--submit agenda button -->
     <input type="submit" value="Submit" />
     <!--pass to the schedule_meeting.php code the meeting ID -->
     <input type="hidden" name="meetingID" value="<?php echo $meetingID; ?>" />
</form>
schedule_meeting.php:
     <?php
     // Get the Agenda information filled into the form
     $intro = $_POST[ 'introduction' ];
     $conc = $_POST[ 'conclusion' ];
     $topic1 = $_POST['item1'];
     $topic1 = $_POST['item2'];
     $topic1 = $_POST['item3'];
     $topic1 = $_POST['item4'];
     $topic1 = $_POST['item5'];
     $meetingID = $_POST['meetingID'];
     // Enter the Agenda info into the database
     $sql = "UPDATE meetings SET
          introduction = '$into',
          conclusion = '$conc',
          topic1 = '$topic1',
          topic1 = '$topic2',
          topic1 = '$topic3',
          topic1 = '$topic4',
          topic1 = '$topic5'
          WHERE meetingID = '$meetingID';
     // Submit agenda to database record for this meeting
     if ( FALSE == mysql_query( $sql) )
          // error handling
     ?>
```

When the participant makes a request for content, they may also optionally specify a topic on the agenda list to which the request is specific. For example, the UI for making the content request may additionally contain a selection box which is pre-populated with the agenda topics. If the participant selects a topic from the selection box, the request is specific to the topic; otherwise, the request is general to the meeting. If the content request is specific to an agenda topic, the meeting service constructs and sends the content request to another or non-meeting participant in the same manner as described earlier, except the embedded meeting identifier additionally contains the topic identifier. For example, the selected topic may be identified by a numerical indicator of its position in the agenda and then appended to the end of the embedded meeting ID and separated by a colon:

0123456789abcdefghijkl:1

Figure 15:
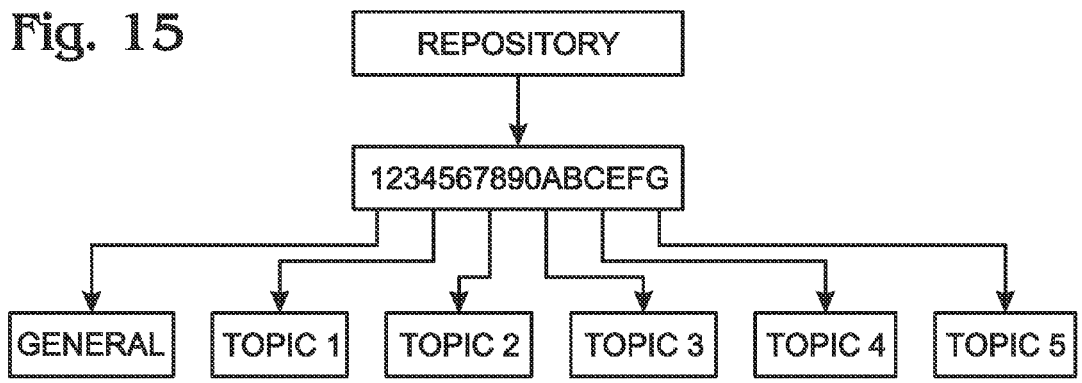
FIG. 15 is a diagram depicting an exemplary repository folder.

FIG. 15 is a diagram depicting an exemplary repository folder. When the meeting service receives a reply to a content request, in addition to the actions taken described earlier, the meeting service determines if the request contains an embedded topic identifier. If not, the content is handled as described earlier. Otherwise, the content is stored in a sub-repository specific to the topic of the document repository specific to the meeting. In one example, the repository is a file folder (e.g., directory) on a file system, where the folder name is the meeting ID. Under the folder is a sub-folder for the general meeting documents, and one sub-folder per agenda topic.

Once a meeting starts, the content in the general part is readily available for selection (viewing/editing). As the meeting moves through the topics, the content per topic is readily available during the discussion of the topic. Otherwise, the content per topic is hidden or only accessible for preview.

In another case, the request for content is specific to a general category which is predetermined in the meeting service, and independent of any organizer entered topics. Examples of predetermined categories may include: participant's status; overall project status; revenue (monthly, quarterly, etc); and, expenses.

Like the "by topic" example, in this example the participant making the request may optionally select a category for a menu item. If selected, the category is appended to the embedded URL. Below are some examples of a category identifier appended to a meeting identifier:

0123456789abcdefg:status
0123456789abcdefg:project
0123456789abcdefg:revenue
0123456789abcdefg:expenses When the meeting service receives a reply to a content request, in addition to the actions taken described earlier, the meeting service determines if the request contains an embedded category identifier. If not, the content is handled as described earlier. Otherwise, the content is stored in a sub-repository specific to the category of the document repository specific to the meeting.

Figure 16:
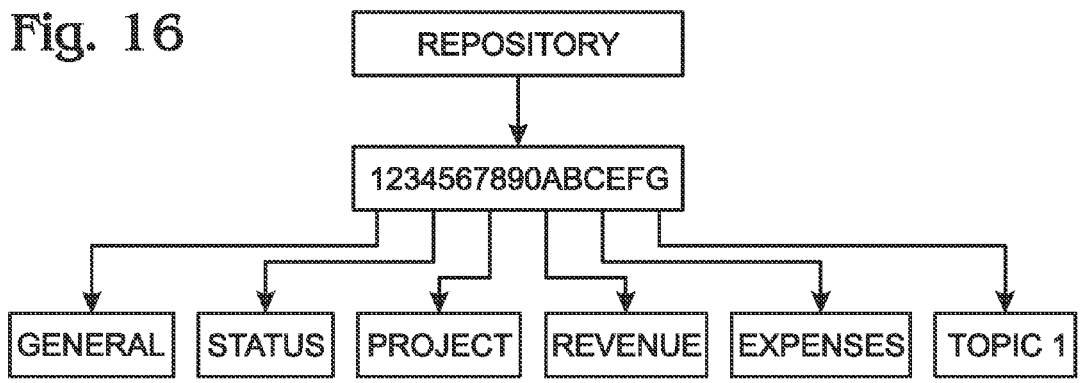
FIG. 16 depicts another example of a repository file folder.

FIG. 16 depicts another example of a repository file folder. In one example, the repository is a file folder (e.g., directory) on a file system, where the folder name is the meeting ID. Under the folder is a sub-folder for the general meeting documents, and one sub-folder per predetermined category.

Once a meeting starts, participants with the appropriate authority may select for preview a category from a menu selection displayed on the meeting application. When selected, the content stored for the category is available for preview. Additionally, a presenter with the appropriate authority may select for viewing/editing a from a menu selection displayed on the meeting application. When selected, the content stored for the category is available for presentation and/or collaborative editing. After the meeting, a recorded archive of the meeting may also be searchable by category. When a category is selected in a recorded archive, the content stored in the category is available for review.

In another aspect, a meeting consists of plural meeting segments. Each meeting segment has a start and finish point and may occur: successively; asynchronously (e.g., overlapping); or at different locations and/or with different participants. For example, a development project may consist of many types of meetings over its lifespan. A recurring set of product pre-planning meetings may terminate with a milestone that kicks off a development phase. A recurring set of product planning meetings may occur during the development phase. A recurring set of product development meetings may terminate with a milestone that kicks of a general release preparation phase. A recurring set of product testing (QA) meetings may terminate with a milestone that with first product release. A recurring set of release candidate meetings that occur until the product is released.

Generally, a predetermined set of information is carried across meeting segments in a set of recurring meetings. Also, a predetermined set of information is exported from one set of recurring meetings to another. In this aspect, one of the items exported across meetings in a recurring set of meetings is an action item list.

Figure 17:
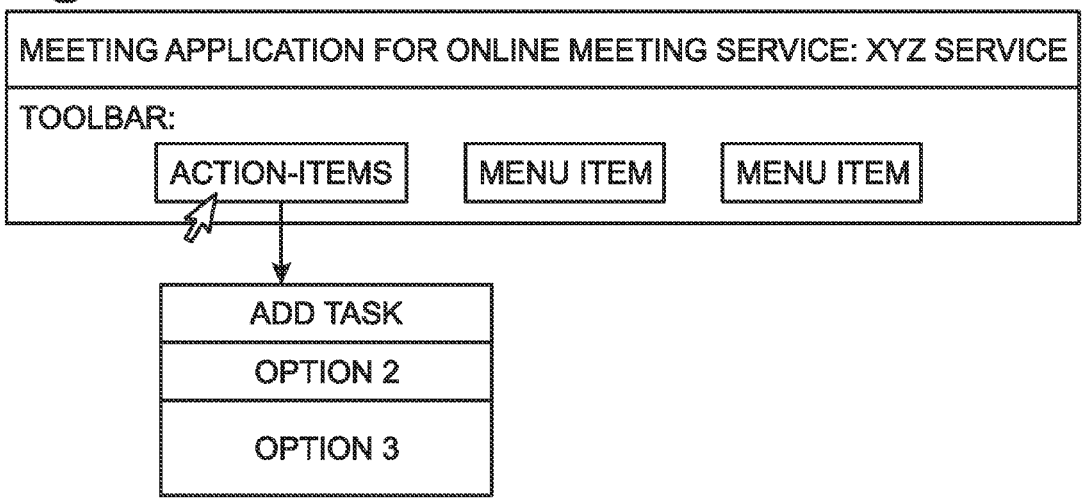
FIG. 17 is a diagram depicting an online meeting service menu for adding action items.

FIG. 17 is a diagram depicting an online meeting service menu for adding action items. The action item list is a predetermined category built into the online meeting service. During the meeting and/or at the end of the meeting, the meeting organizer or other authorized participant can select adding tasks-to-do to the action item list. In one example, the participant (e.g., organizer, presenter, or attendee) selects a menu option to add a task to the action-list. For example, the menu option may be a pull down menu on an option toolbar, labeled 'Action-List'. The participant then selects an option (e.g., 'Add Task') on the pull-down menu that causes another menu to appear from which the participant can add a task to the action list.

When the participant selects the option 'Add Task', a menu may appear that contains the inputs: Task Title; Task Owner; Description of the Task; and, Content required for completion of the task. The participant then fills in a title, description, and any required content for completing the task. Additionally, a task owner is selected. The task owner (assignee) may be a meeting or non-meeting participant, and may include an automated computer process. The task owner may be selected from an Address Book or manually entered along with their electronic communication address (as discussed earlier for selecting non-meeting participants).

At the end of the meeting segment, the online meeting service processes the action item list. Each action item is given a unique identifier. The online meeting service then constructs and sends an email message (or other electronic communication) per action item. The email message is addressed to the electronic address of the task owner. The body of the electronic message contains the task description and required content for completion.

Figure 18:
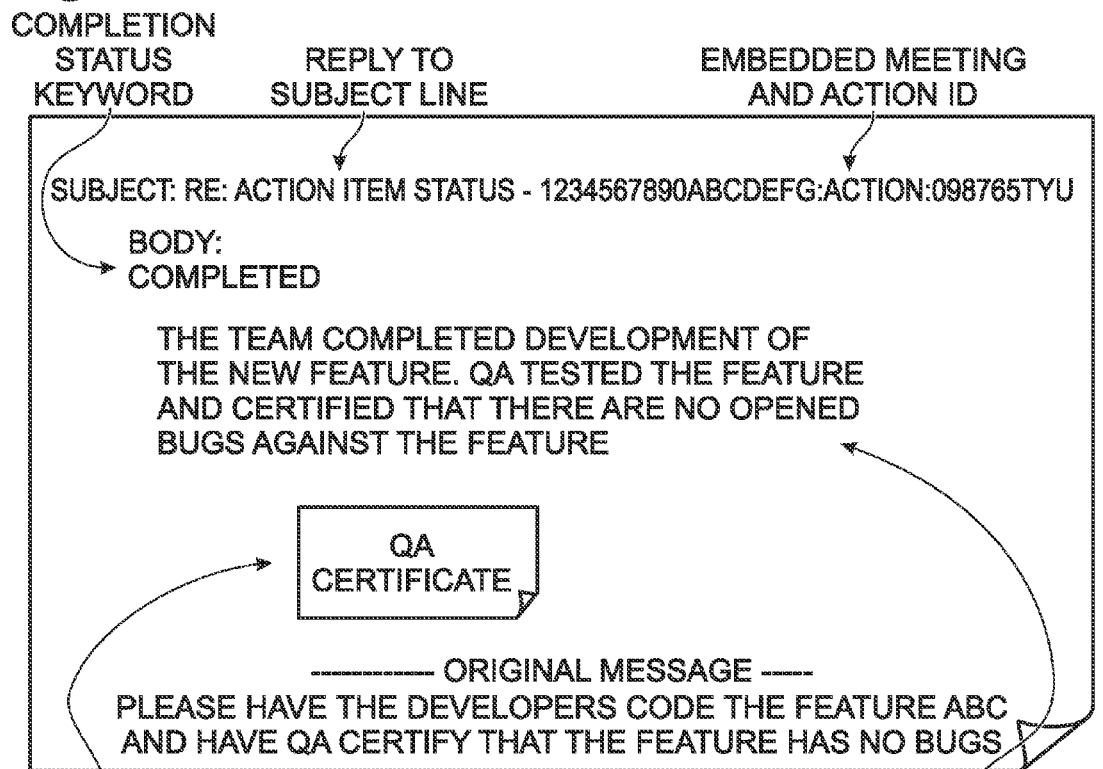
FIG. 18 is an exemplary email message triggered as the result of an online meeting action item.

FIG. 18 is an exemplary email message triggered as the result of an online meeting action item. A second email is then later sent to each task owner, per action item, just prior to the start of the next meeting segment. The time prior may be a predetermined time (e.g., 1 day before) or set as a parameter in the action item list. The email message requests the task owner for an update on the action item. Additionally, the email message contains an embedded identifier for the associated meeting, which is further augmented to contain the unique identifier for the action item. Below is an example identifier:

1234567890abcdefg:Action:098765tyu

The task owner can then respond to the action item status update request with the message body containing a response to the status of the action item list; the message body containing a keyword indicating the completion status; and, attachments for any required content.

Upon receipt of the reply to the action item task email, the online meeting service email client: extracts the embedded meeting identifier (e.g., 1234567890abcdefg) and action item task identifier (e.g., 098765tyu); extracts the completion status keyword in the message body (e.g., Completed); extracts the remainder of the message body as the task status description; and, extracts the required content.

Once the above information is extracted, the online meeting service updates the action item status for the specific action item/meeting. The service locates the action item record in the database for the meeting, where the action item ID is the primary key, and the meeting ID is a secondary key linking the action item record to a specific meeting record. The meeting service updates the completion field of the action item record, adds the textual description to the task status field, and stores content in the document repository in a subfolder designated for action items. Links are included in the action item record to the stored required content.

Figure 19:
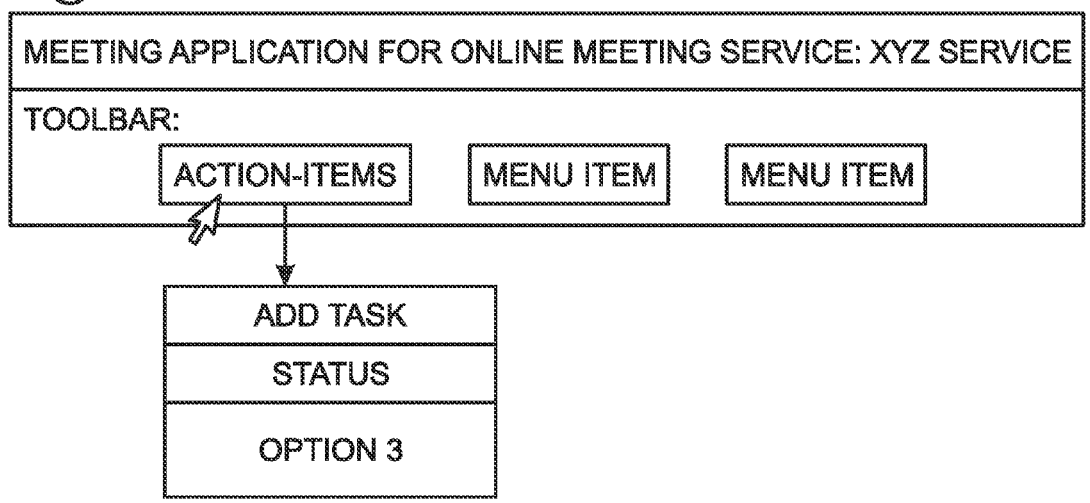
FIG. 19 is a diagram depicting a menu for reviewing the status of action items from previously held meetings.

FIG. 19 is a diagram depicting a menu for reviewing the status of action items from previously held meetings. When the next meeting segment is started, the meeting organizer or other authorized participant can review the status of action items from the last meeting by selecting the action item menu, as described earlier, and then selecting the option 'status'. When the status option is selected, the status and textual status description are displayed, and any required content (along with the status/text) can be previewed and/or presented/edited with the meeting participants.

In another aspect, the requester of the content sets an importance level on receiving the content. Additionally, the requestor may set a timeframe to receive the content. Alternately, an automated process may set the importance level/timeframe based for example on the category type.

The system may also send email reminders for the content to the non-meeting participant. The frequency of the email reminders may be based on the importance level. For unimportant content, no reminders may be sent. For important content, a reminder may be sent on the day the content is required. For urgent content, a reminder may be sent on the day it is required, and 30 minutes before the content is required.

In another case, the importance level may be used to determine how to handle the content if it arrives outside of the expected timeframe (i.e., late). Unimportance content arriving after meeting may be added to the meeting archive. Important content arriving after the meeting may be added to the meeting archive, and a notification sent to the meeting organizer. Urgent content arriving after the meeting may be added to the meeting archive, and a "Meet Now" meeting may be initiated with the Organizer. A "Meet Now" notification can also be sent to meeting's previous attendees.

FIG. 20 is a flowchart illustrating a method for providing electronic documents to online meeting participants in a system of connected communication devices. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally, the method steps proceed in numerical order. The method starts at Step 2000.

Step 2002 schedules a first online meeting between network-connected computer devices. In Step 2004 a meeting server establishes a repository for the first online meeting. In Step 2006 the meeting server receives an electronically formatted document sent to a first communication address assigned to the first online meeting repository. As noted above, the document may be received before, during, or after the first online meeting. Step 2008 stores the document in the first online meeting repository. In Step 2010 a first computer device logs into the meeting server, and in Step 2012 the first computer device accesses the document from the first online meeting repository.

As noted above, the document can be accessed at a time prior to, during, and after the first online meeting. In one aspect, the first computer device accessing the document (Step 2012) while participating in the first online meeting, and in Step 2014 the first computer device presents the document into the first online meeting. Alternately, a second computer device accessing the document while participating in the first online meeting, and the second computer device presents the document into the first online meeting in Step 2014.

In another aspect, Step 2006 receives the document prior to beginning the first online meeting, as follows. In Step 2006*a* a second computer device receives an invitation to the first online meeting with the first communication address coded into the invitation. In Step 2006*b* the second computer device sends the document to the first communication address when accepting the invitation. In one variation, Step 2006*a* includes the first computer device sending a document request to a second computer device, not participating in the first online meeting. This might be the case if the second computer device does not have access to the first online meeting. For example, the second computer device may have email communication capabilities, but not have Internet access, or access to the first online meeting is blocked by a firewall.

For example, in Step 2006*a* the first computer device sends the document request with the first communication address coded into the request, and in step 2006*b* the second computer device sends the document to the first communication address when responding to the document request. In another variation, the first computer device may send the document request of Step 2006*a* while participating in the first online meeting. In yet another variation, Step 2006*a* includes sending a document request reminder to the second computer device, if the document is not received within a predetermined period of time.

In another aspect, the second computer device receives either a document request or an invitation to the first online meeting in Step 2006*a*, and in Step 2006*b* sends the document to the first communication address with an electronically formatted note including comments related to the document. Step 2008 stores the document and the note, with a link to the note, and Step 2012 accesses the document and the note.

In one aspect, receiving the document sent to the first communication address in Step 2006 includes the meeting server temporarily assigning the first communication address, exclusively associated with the first online meeting. For example, the first communication address may be a particular email address. Alternately, the meeting server receives the document with the following substeps. In Step 2006*c* the meeting server establishes a permanent first communication (e.g., email) address associated with a plurality of online meetings. In Step 2006*d* the meeting server assigns an identifier to the first online meeting, such as a meeting PIN, the Internet Protocol (IP) address of a computer device participating in the first online meeting, a meeting title, a name designated as the first online meeting host, or a URL associated with the first online meeting.

In one aspect, establishing the repository for the first online meeting in Step 2004 includes the meeting server establishing a plurality of categories associated with the first online meeting. Then, subsequent to receiving the document in Step 2006, the meeting server associates the document with one of the first online meeting categories in Step 2007. Step 2007 may also include the meeting server performing an operation on a document request, returned with the received document, such as parsing a document request for keywords associated with categories or recognizing an embedded category identifier in the document request.

In another aspect, scheduling the first online meeting in Step 2002 may include scheduling a recurring first online meeting comprising a first meeting segment and a second meeting segment. Then, receiving the document sent to the first communication address in step 2006 includes receiving a document requested in response to a first meeting segment action item. In a related aspect, Step 2002 may schedule the second meeting segment in response to receiving the document.

A system and method have been presented for provisioning electronic documents to an online meeting. Examples of particular communication formats and organization structures have been used to illustrate the invention. However, the invention is not limited to just these examples. Other variations and embodiments of the invention will occur to those skilled in the art.

I claim:

1. In a system of connected communication devices, a method for providing electronic documents to online meeting participants, the method comprising:
    a meeting server establishing an online meeting repository for a first online meeting, where the first online meeting is exclusively assigned to a first URL address;
    the meeting server receiving an electronically formatted document sent to a first email address associated with the first online meeting;
    storing the document in the online meeting repository;
    without a requirement of participating in the first online meeting, a first computer device logging into the meeting server via the first email address; and,
    in response to logging in via the first email address, the first computer device accessing the document, received via the first email, from the online meeting repository.

2. The method of claim 1 wherein accessing the document includes the first computer device accessing the document at a time selected from a group consisting of prior to, during, and after the first online meeting.

3. The method of claim 1 wherein accessing the document includes the first computer device accessing the document while participating in the first online meeting; and,
    the method further comprising:
    the first computer device presenting the document into the first online meeting.

4. The method of claim 1 wherein receiving the document sent to the first email address includes receiving the document prior to beginning the first online meeting.

5. The method of claim 4 wherein receiving the document prior to beginning the first online meeting includes:
    a second computer device receiving an invitation to the first online meeting with the first email address coded into the invitation; and,
    the second computer device sending the document to the first email address when accepting the invitation.

6. The method of claim 1 wherein receiving the document sent to the first email address includes:
    the first computer device sending a document request to a second computer device, not participating in the first online meeting, for the document; and,
    the second computer device sending the document to the first email address.

7. The method of claim 6 wherein sending the request to the second computer device for the document includes:
    the first computer device sending the document request with the first email address coded into the request; and,
    the second computer device sending the document to the first email address when responding to the document request.

8. The method of claim 6 wherein sending the document request to a second computer device includes the first computer device sending the document request while participating in the first online meeting.

9. The method of claim 6 wherein sending the document request to a second computer device includes sending a document request reminder to the second computer device, if the document is not received within a predetermined period of time.

10. The method of claim 1 wherein establishing the online meeting repository for the first online meeting, where the first online meeting is exclusively assigned to the first URL address, includes the meeting server temporarily assigning the first email address, exclusively associated with the first online meeting.

11. The method of claim 1 wherein establishing the online meeting repository for the first online meeting, where the first online meeting is exclusively assigned to the first URL address, includes:
    the meeting server establishing a permanent first email address associated with a plurality of online meetings; and,
    the meeting server assigning an identifier to the first online meeting, where the identifier is selected from a group consisting of a meeting PIN, the Internet Protocol (IP) address of a computer device participating in the first online meeting, a meeting title, a name designated as the first online meeting host, and a URL associated with the first online meeting.

12. The method of claim 1 wherein establishing the online meeting repository for the first online meeting, where the first online meeting is exclusively assigned to the first URL address, includes the meeting server temporarily assigning the first URL address, exclusively associated with the first online meeting.

13. The method of claim 1 wherein establishing the online meeting repository for the first online meeting, where the first online meeting is exclusively assigned to the first URL address, includes:
    the meeting server establishing a permanent first URL address associated with a plurality of online meetings; and,
    the meeting server assigning an identifier to the first online meeting, where the identifier is selected from a group consisting of a meeting PIN, the Internet Protocol (IP) address of a computer device participating in the first online meeting, a meeting title, a name designated as the first online meeting host, and a URL associated with the first online meeting.

14. The method of claim 1 wherein receiving the document sent to the first email address includes receiving the document from a computer device having email communication capabilities, but not having Internet access.

15. The method of claim 1 receiving the document sent to the first email address includes receiving the document from a computer device not having access to the first online meeting.

16. The method of claim 1 wherein establishing the repository for the first online meeting includes the meeting server establishing a plurality of categories associated with the first online meeting; and,
the method further comprising:
subsequent to receiving the document, the meeting server associating the document with one of the first online meeting categories.

17. The method of claim 16 wherein associating the document with one of the first online meeting categories includes the meeting server performing an operation on a document request, returned with the received document, the operation selected from a group consisting of parsing a document request for keywords associated with categories and recognizing an embedded category identifier in the document request.

18. The method of claim 1 further comprising:
scheduling a recurring first online meeting comprising a first meeting segment and a second meeting segment; and,
wherein receiving the document sent to the first email address includes receiving a document requested in response to a first meeting segment action item.

19. The method of claim 18 wherein scheduling the first online meeting includes scheduling the second meeting segment in response to receiving the document.

20. The method of claim 1 wherein receiving the document sent to the first email address includes:
a second computer device receiving a message selected from a group consisting of a document request and an invitation to the first online meeting; and,
the second computer device sending the document to the first email address with an electronically formatted note including comments related to the document;
wherein storing the document in the online meeting repository includes storing the document and the note, with a link to the note; and,
wherein accessing the document from the first online meeting repository includes accessing the document and the note.

21. The method of claim 1 wherein accessing the document includes a second computer device accessing the document while participating in the first online meeting; and,
the method further comprising:
the second computer device presenting the document into the first online meeting.

22. An electronic document provision system or online meetings, the system comprising:
a meeting server having a repository for a first online meeting having a first URL address, the meeting server receiving an electronically formatted document sent to a first email address assigned to the first online meeting, at a time selected from a group consisting of prior to, during, and after the first online meeting, and storing the document in the online meeting repository; and,
a network-connected first computer device logging into the meeting server via the first email address and, without the requirement of participating in the first online meeting, accessing the document from the online meeting repository at a time selected from a group consisting of prior to, during, and after the first online meeting.

23. The system of claim 22 wherein the first computer device accesses the document while participating in the first online meeting, and presents the document into the first online meeting.

24. The system of claim 22 further comprising:
a second computer receiving an invitation to the first online meeting with the first email address coded into the invitation, and sending the document to the first email address when accepting the invitation.

25. The system of claim 22 further comprising:
a second computer device, not participating in the first online meeting receiving a document request from the first computer device, and sending the document to the first communication address.

26. The system of claim 25 wherein the second computer receives the document request with the first email address coded into the request.

27. The system of claim 22 wherein the meeting server temporarily assigns the first email address, exclusively associated with the first online meeting.

28. The system of claim 22 wherein the meeting server establishes a permanent first email address associated with a plurality of online meetings, and assigns an identifier to the first online meeting, where the identifier is selected from a group consisting of a meeting PIN, an Internet Protocol (IP) address of a computer device participating in the first online meeting, a meeting title, a name designated as the first online meeting host, and a URL associated with the first online meeting.

29. The system of claim 22 wherein the meeting server establishes a plurality of categories associated with the first online meeting, and subsequent to receiving the document, associates the document with one of the first online meeting categories.

30. The system of claim 22 wherein the meeting server accepts a recurring first online meeting schedule comprising a first meeting segment and a second meeting segment, and receives the document requested in response to a first meeting segment action item.

31. The method of claim 30 wherein the meeting server, in response to receiving the document, performs an action selected from a group consisting of scheduling the second meeting segment and sending a request to the meeting organizer to schedule the second meeting segment.

* * * * *

UNITED STATES PATENT AND TRADEMARK OFFICE
CERTIFICATE OF CORRECTION

| | | |
|---|---|---|
| PATENT NO. | : 9,461,834 B2 | Page 1 of 1 |
| APPLICATION NO. | : 12/765777 | |
| DATED | : October 4, 2016 | |
| INVENTOR(S) | : Andrew Ferlitsch | |

It is certified that error appears in the above-identified patent and that said Letters Patent is hereby corrected as shown below:

In column 29, line 48, claim 22, the word "for" has been incorrectly printed as --or--.

Claim 22 should be printed as follows:

22. An electronic document provision system for online meetings, the system comprising:
a meeting server having a repository for a first online meeting having a first URL address, the meeting server receiving an electronically formatted document sent to a first email address assigned to the first online meeting, at a time selected from a group consisting of prior to, during, and after the first online meeting, and storing the document in the online meeting repository; and,
a network-connected first computer device logging into the meeting server via the first email address and, without the requirement of participating in the first online meeting, accessing the document from the online meeting repository at a time selected from a group consisting of prior to, during, and after the first online meeting.

Signed and Sealed this
Twenty-ninth Day of November, 2016

Michelle K. Lee
*Director of the United States Patent and Trademark Office*